United States Patent [19]

Bertoni

[11] Patent Number: 5,761,659
[45] Date of Patent: Jun. 2, 1998

[54] METHOD, PRODUCT, AND STRUCTURE FOR FLEXIBLE RANGE LOCKING OF READ AND WRITE REQUESTS USING SHARED AND EXCLUSIVE LOCKS, FLAGS, SUB-LOCKS, AND COUNTERS

[75] Inventor: Jonathan L. Bertoni, Mountain View, Calif.

[73] Assignee: Sun Microsystems, Inc., Palo Alto, Calif.

[21] Appl. No.: 607,965

[22] Filed: Feb. 29, 1996

[51] Int. Cl.$^6$ .................................................. G06F 17/30
[52] U.S. Cl. .................................. 707/8; 707/7; 707/201
[58] Field of Search .............................. 395/726, 608; 707/7, 8, 201

[56] References Cited

U.S. PATENT DOCUMENTS

| | | | |
|---|---|---|---|
| 4,716,528 | 12/1987 | Crus et al. | 395/726 |
| 5,202,971 | 4/1993 | Henson et al. | 707/8 |
| 5,265,245 | 11/1993 | Nordstrom et al. | 707/8 |
| 5,285,528 | 2/1994 | Hart | 395/726 |
| 5,414,840 | 5/1995 | Rengarajan et al. | 707/201 |
| 5,485,607 | 1/1996 | Lomet et al. | 395/608 |
| 5,537,645 | 7/1996 | Henson et al. | 395/680 |
| 5,551,027 | 8/1996 | Choy et al. | 707/201 |

*Primary Examiner*—Thomas G. Black
*Assistant Examiner*—Charles L. Rones
*Attorney, Agent, or Firm*—Beyer & Weaver, LLP

[57] ABSTRACT

A flexible, low cost range locking mechanism allows a process requesting a lock to place a lock upon any requested range within a resource of a computer system. Various processes may hold locks upon different ranges of a resource simultaneously. A particular range may also be locked by different processes that are able to share the range. A sub-lock represents a unique range of the resource and has begin and end points that identify that portion of the requested range to which the sub-lock corresponds. A locked range may include numerous sub-locks. Each sub-lock has a mode indicating whether the sub-lock represents a shared lock, an exclusive lock or other. Sub-locks also have an incremental counter indicating the number of processes that hold a read lock upon a region, a flag to indicate whether a process is waiting to lock the region, a queue for listing waiting processes and other attributes. Sub-locks are stored in a data structure sequentially in the order in which they occur within the resource to facilitate searching. A range of a resource that is locked by one or more processes is indicated by setting the incremental counter of the sub-lock corresponding to that range to the number of processes that share the range. A requested range that either begins or ends within a previously locked region may result in the region being split into two distinct and contiguous regions, each region having a corresponding sub-lock. A range beginning and ending within a locked region splits the region into three regions.

25 Claims, 11 Drawing Sheets

METHOD, PRODUCT, AND STRUCTURE FOR FLEXIBLE RANGE LOCKING OF READ AND WRITE REQUESTS USING SHARED AND EXCLUSIVE LOCKS, FLAGS, SUB-LOCKS, AND COUNTERS

FIELD OF THE INVENTION

The present invention relates generally to a locking technique used for shared resources within a computer system. More specifically, a low-cost flexible range locking technique that is adapted to lock a specific range of resource is described.

BACKGROUND OF THE INVENTION

In file systems and virtual memory implementations, it is often necessary to apply shared and exclusive access locks to arbitrary ranges of a resource. For example, in a file system a process executing a read operation on a file might require shared access to a specific byte range of that file. Alternatively, an exclusive write lock may need to be applied to a portion of a file or resource. Previous implementations have implemented a single lock on the entire file. Prior art locking schemes for files have operated on the whole file as a unit. In addition, in virtual implementations memory locking is in general done on a per page basis. Thus, prior locking schemes have locked the whole file as a unit or as a page, possibly precluding access to the file by other system processes. If the original process is only using a small portion of the file, inefficiency results and parallelism of computing is lost.

With a shared resource in a computer system, such as a file, memory cache, virtual memory page, or other, it may be desirable to lock a portion of this resource at arbitrary locations rather than at fixed units within the resource. For example, if an unused portion of a lengthy file is written out to tape for backup, it would be desirable to lock only this section of the file instead of having to lock out the complete file or blocks within the file. For virtual memory implementations, certain kernel functions require locking memory pages with the result that paging operations cannot relocate data. An arbitrary range locking technique would be desirable as a flexible way to maintain and cache such locks, without resorting to or in addition to per-page locks.

Certain standards may require that write operations to a file appear as atomic. For example, the POSIX standard (IEEE Application Programming Interface standard) specifies basic operating system functions and their semantics. Specifically, it defines write operations on files such that all writes appear as atomic operations to all other I/O operations on that file. Hence, there is a need for file locking. An arbitrary range locking technique would make the process efficient and highly parallel for non-overlapping writes and non-conflicting reads.

It is known in the art to perform locking on a block per block basis, such as is used for databases. But this solution has high overhead costs. For example, if a user wishes to lock out a large section of the database, it would be necessary to execute a lock upon each and every block within this large section, resulting in very high overhead costs. It is also known in the art to lock a complete file. However, this solution is undesirable especially if multiple users within a system or multiple users on a computer network desire to access this file or resource. Thus, it would be desirable to develop a flexible range locking technique that would allow for low cost locking of arbitrary ranges of resources within a computer system, such as files, memory caches, virtual objects, and the like. Such a range locking technique would be advantageous in that it would allow different processes to access and lock portions of the same resource at the same time, resulting in higher computing parallelism.

SUMMARY OF THE INVENTION

A method, apparatus and computer-readable medium allows a process requesting a lock to place a lock upon any requested range within a resource of a computer system. At a given point in time, the resource may have different and arbitrary locked and unlocked portions. The technique allows for a plurality of locks to be simultaneously placed upon the resource, and includes the following steps. First, requesting that a lock be placed upon a requested range within a resource. The requested range includes a start point and an end point within the resource. Next, creating a first sub-lock which corresponds to a portion of the requested range within the resource. The first sub-lock has a first sub-lock begin point and a first sub-lock end point, and the first sub-lock begin point corresponds to the start point of the requested range. Next, a second sub-lock is created which corresponds to a second distinct portion of the requested range within the resource that is contiguous with but does not overlap with the first portion. The first and second portions may have different sizes. Sub-locks are created in this fashion until the requested range is locked.

An embodiment of the present invention includes a sub-lock data structure for storing the created sub-locks that correspond to unique portions of the requested range. Each sub-lock has attributes that identify that unique portion of the requested range to which the sub-lock corresponds. Each sub-lock may also have a mode that indicates whether the sub-lock represents a read lock or a write lock. Sub-locks may also have an incremental counter to indicate how many processes hold a read lock upon a region, a flag to indicate whether a process is waiting to lock the region, a queue for listing waiting processes and other attributes. Sub-locks may be accessed sequentially in the order in which they occur within the resource to facilitate searching.

If a requested range either begins or ends within an existing sub-lock, or is contained within an existing sub-lock, the existing sub-lock may be split into two or three sub-locks. If the start point of the requested range is located at an intermediate position within the range of an existing sub-lock, the end point of the intersected previously stored sub-lock is set to the start point of the requested range. Next, a new sub-lock is created and its start point is set to the beginning of the requested range, and its end point is set to the original end of the existing sub-lock. The incremental counter associated with this new sub-lock will be set to the value of the counter associated with the existing sub-lock plus one. If a requested range ends within an existing sub-lock, this existing sub-lock is split in a similar fashion. Likewise, if a requested range both begins and ends within an existing sub-lock, that sub-lock will be split into three distinct and contiguous regions and their corresponding sub-locks. The first sub-lock will correspond to the beginning of the existing range up to the beginning of the requested range. The second sub-lock extends from the beginning of the requested range to its end. And the third sub-lock extends from the end of the requested range to the end of the existing sub-lock.

If a lock request cannot succeed because a region it wishes to lock has already been exclusively locked, the request may enter the queue for the sub-lock corresponding to that region. If the lock request is a non-block request, then the request will fail immediately and will not enter the queue. If both a desired region and a lock request are read locks (or shared locks), then the desired region may have more than one read lock upon it at a given time, as indicated by the incremental counter of the sub-lock.

This flexible locking mechanism for ranges of a resource has been developed to allow higher parallelism. The mechanism allows multiple outstanding shared and exclusive range locks on subsections of a file or other resource, with simple and low cost algorithms. This locking mechanism allows high levels of parallelism between operations on a single file without sacrificing IEEE POSIX standards conformance or ease of implementation. Flexible range locking also allows the granularity of locking of the per page approach with a much lower cost in space and time in virtual memory implementations. The mechanism may be used for any range-based resource.

BRIEF DESCRIPTION OF THE DRAWINGS

The invention, and further advantages thereof, may best be understood by reference to the following description taken in conjunction with the accompanying drawings in which.

DETAILED DESCRIPTION OF THE INVENTION

The present invention allows for flexible locking of ranges of a resource by different processes at the same time. The concept of a sub-lock is used to represent a unique range of a resource that is locked by one process or by many processes and does not overlap any other sub-locks. All outstanding sub-locks are stored in a sub-lock list which is constantly updated as locks are placed or removed. Of course, any suitable data structure may be used in which to store the sub-locks.

The approach also allows some tradeoffs in locking accuracy versus overhead and space, but in general describes the locks on a resource as a set of sub-locks. Each sub-lock refers to a range of the resource, and contains a description of the locks outstanding on that range. When a new range is to be locked, the list of sub-locks is searched, and the new lock is enforced by waiting for availability and then updating the locking information of overlapping pre-existing sub-locks, and creating new sub-locks for ranges not currently locked. In addition, sub-locks can be "split" at a slight cost in space and time if locking must be kept to a minimum. Otherwise, sub-locks that extend before or after the desired lock range can be locked in their whole.

Figure 2A:
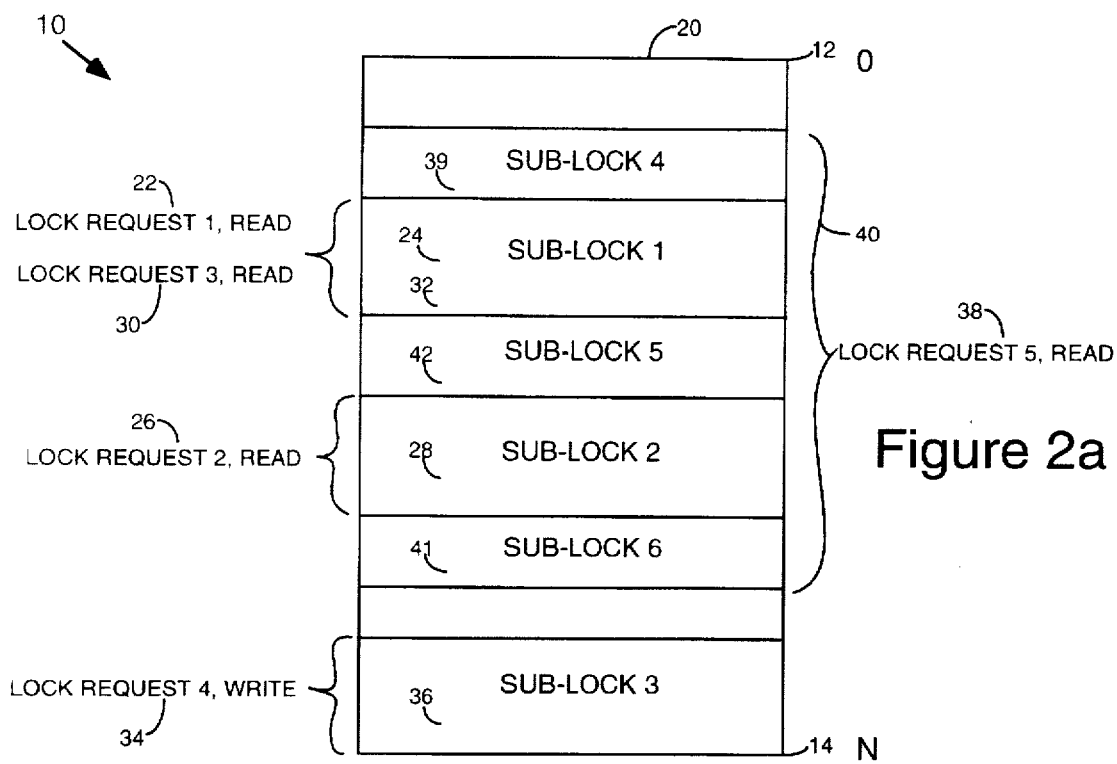
FIG. 2a shows a resource in a computer system with locks placed upon it by different processes.
Figure 2B:
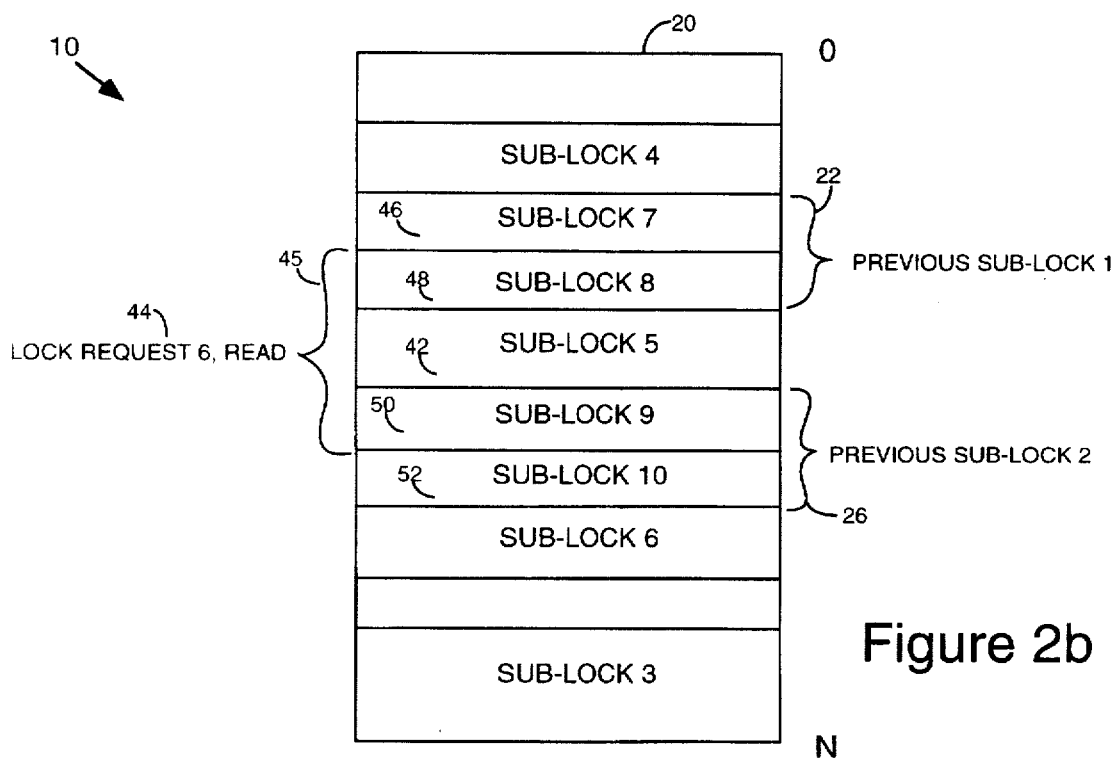
FIG. 2b shows the same resource with a further lock placed upon it.

FIGS. 2a and 2b show at 10 a resource 20 of a computer system which is in the process of having various locks applied to regions within the resource. It is contemplated that the resource 20 could be any resource of a computer system that is accessible by one user or many users. By way of example, the resource may be a file on hard disk, tape or the like. The resource may be a portion of memory or a virtual object. A virtual object is any logical or conceptual resource that can be described as an ordered set, and which a user may wish to lock in whole or in part based upon range constraints. The nature of the resource is such that it may be desirable at a given point in time for one or more users to apply a lock to either the complete resource or to only a portion of the resource. In this example, the resource is shown as stretching from location zero to location N. A user such as the computer operating system, a process, a program, or the like within the computer system may wish to apply a certain type of lock to a portion of the resource. This lock may be of any nature, and would indicate in some fashion that the user desires to either use a portion of the resource, to exclude others from the resource, or to perform some other task.

By way of example, two common locks used are the read lock and the write lock. A read lock is also known as a shared lock, and exists when a user merely wishes to read a portion of the resource and does not wish to change it. This type of lock is also called a shared lock because for a given region of the resource many different users may apply a read lock to this portion at the same time. A write lock, also known as an exclusive lock, indicates that one and only one user has exclusive access to a portion of the resource. This exclusive access may be desired because the user wishes to write to the region, or perhaps because this region has been removed from the resource. For example, when a portion of a file is moved to a tape, as in a hierarchical data management service, this portion of the file is no longer resident on the computer and must be locked in some fashion. The present invention would allow just this portion of the file to be locked. Thus, when an attempt is made to gain access to that portion of the file, the process performing the tape management can be notified and would retrieve the required data. If a user has a write lock applied to a portion of the resource this means that no other user may apply a read or write lock to the same portion of the resource. In addition, a portion of the resource that is read locked may not be write locked by another user.

The resource 20 begins as shown in FIG. 2a at a location 0, 12 and extends to location N 14. The reference N indicates the number of units within the resource. It is contemplated that the reference N could indicate any type of unit. By way of example, the units by which a resource is divided could be bits, bytes, words, blocks, files or the like.

The resource 20 could be any resource within a computer system. By way of example, the resource 20 could be a file, a portion of a file, an object, a software object stored in memory, a unit of memory, a floppy disk, a hard disk, an optical disk, a tape drive backup, or any other resource or media used by a computer system or network that is accessible by a user.

FIG. 2a shows specifically a file 20 stretching from location 0 to location N which is the subject of numerous lock requests. Shown in particular at 22 is a Lock Request 1 which desires to place a read lock on the region indicated which is shown at 24. A technique for indicating that Lock Request 1 has placed a read lock upon this region 24 is performed by using the concept of a sub-lock. A particular sub-lock indicates that a particular region within the file is the subject of a lock by a lock request. A sub-lock always corresponds to a region within the file. In this example, a Sub-Lock 1 has been created to indicate that the region 24 has had a read lock placed upon it by Lock Request 1.

Figure 4:
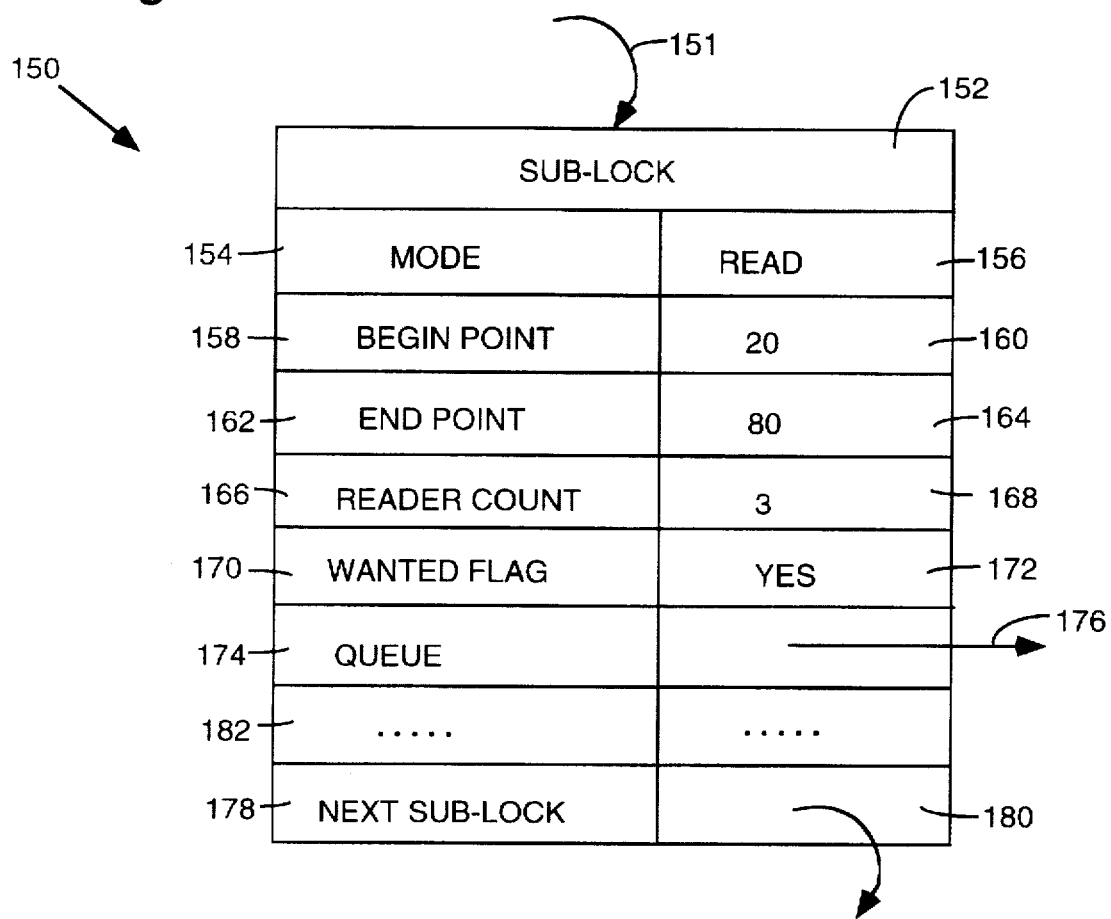
FIG. 4 shows symbolically various attributes for a sub-lock.

A sub-lock is a unit of information that contains various attributes pertaining to this region and any locks upon it. A sub-lock may be implemented in hardware, software or the like, by way of example a sub-lock is implemented as an object within a computer system and has various attributes. One possible implementation for a sub-lock is shown symbolically in FIG. 4 at 150. A sub-lock may have numerous attributes. Possible attributes for a sub-lock will now be described. In one embodiment of the invention a sub-lock would have the attributes Mode 154, Begin Point 158, End Point 162, Reader Count 166, Wanted Flag 170, Queue 174, and Next Sub-Lock 178. It is contemplated that a sub-lock could have other attributes which are indicated at 182.

In this sub-lock example the attribute Mode 154 has the value READ 156 which indicates that the region corresponding to this sub-lock has a read lock placed upon it. As discussed above, Mode could also be WRITE or some other type of lock that a user wishes to place upon this region. The attributes Begin Point and End Point indicate the range of the sub-lock. For example, the attribute Begin Point 158 has the value 20 which indicates that this read sub-lock corresponds to a range within a file that begins at location 20. The attribute End Point 162 has a value 80 which indicates that this read sub-lock corresponds to a range within a file which ends at location 80. The attribute Reader Count 166 has the value 3 which indicates that three read lock requests have been placed upon this range. A Reader Count of one or above for a read sub-lock indicates that one or more users have desired to place a read lock upon this range. A Reader Count of zero indicates that there is no current lock of any type upon this range. For a sub-lock of type WRITE the Reader Count must always be one which indicates the exclusive nature of a write lock.

The attribute Wanted Flag 170 has the value YES 172 which indicates that another user wishes to place a lock upon this range. For example, another user may wish to place an exclusive write lock upon this region, but as three other users already have read locks upon this region, the user desiring a write lock must wait until the range is completely unlocked. In this scenario, the Wanted Flag is set to YES to indicate that at least one other user wishes to place a lock upon this range.

These waiting users are stored in a queue. The attribute Queue 174 represents a queue 176 which indicates all of the other users which are waiting to place a lock upon this range. For example, if there is at least one user waiting in the Queue the Wanted Flag will be set to YES. On the other hand, if there are no users in the Queue, then of course the Wanted Flag would be set to NO. The Queue 174 may be implemented in any fashion as appropriate. By way of example, this Queue 174 may be implemented as a first-in first-out (FIFO) singly-linked list which keeps track in chronological order of the users that are requesting a lock upon a range. As is known in the art, there are many other techniques for implementing this queue structure. It is contemplated that a user who is chronologically first in requesting a lock upon a range may not necessarily be the first user to be granted access to that range when the range becomes unlocked. It is contemplated that various priority schemes could be implemented to determine which user in a queue should be granted first access to a recently unlocked region. By way of example, it may be desired to grant all requested write locks priority over all requested read locks. Alternatively, the queue could be implemented in a last-in first-out (LIFO) or stack structure instead of a FIFO structure. Many other different types of prioritization are possible. The attribute Next Sub-Lock 178 contains a pointer 180 which indicates the next sub-lock in the Sub-Lock List. Likewise, the pointer 151 is a pointer from a preceding sub-lock which points to the sub-lock 150.

Figure 3:
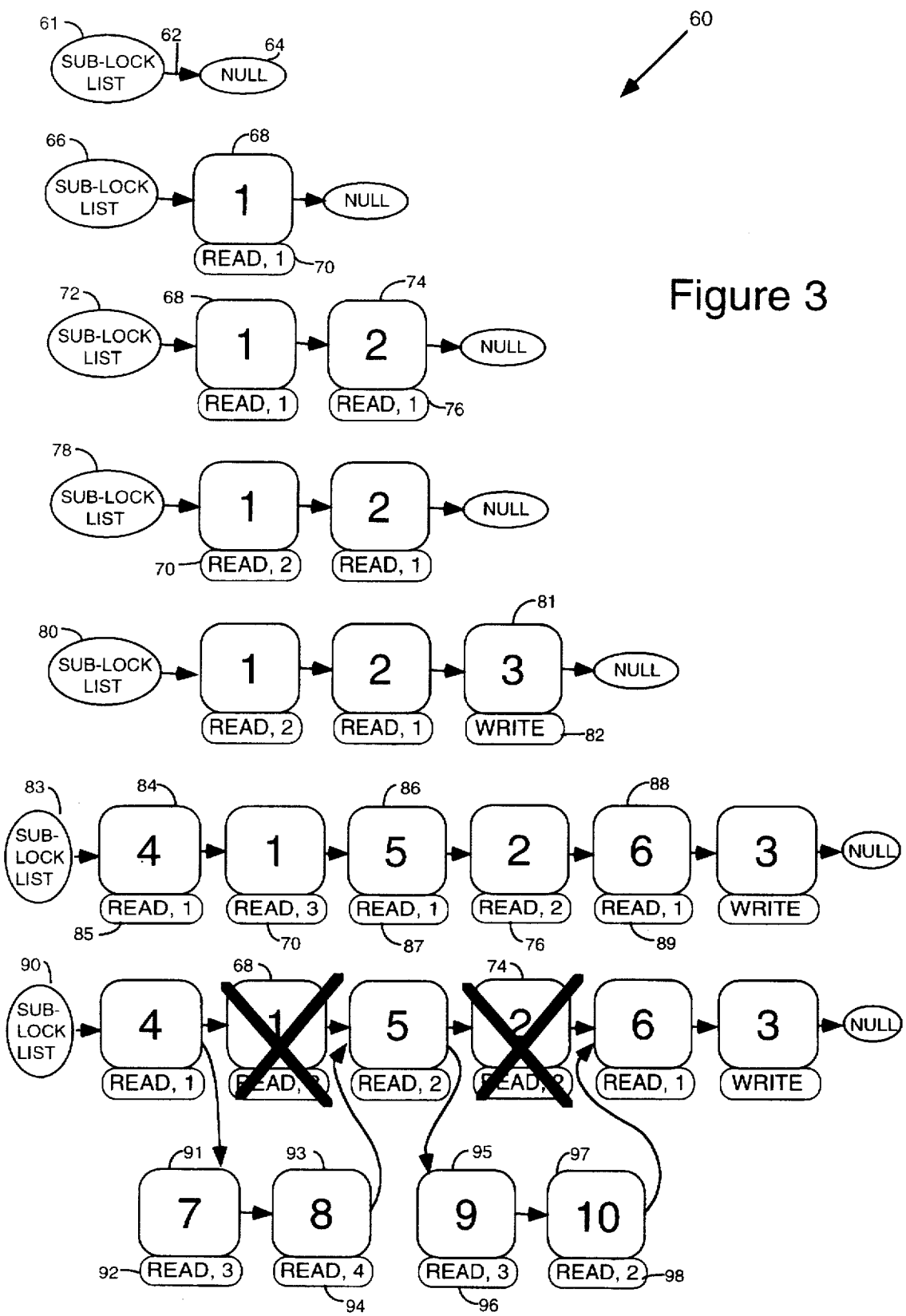
FIG. 3 shows symbolically the dynamic nature of the sub-lock list in the context of the lock operations of FIGS. 2a and 2b.

A technique for keeping track of the various sub-locks within a file is symbolically illustrated in FIG. 3. FIG. 3 at 60 shows symbolically a singly-linked Sub-Lock List which keeps track of all current sub-locks within a file. One skilled in the art will appreciate that there are other techniques possible for representing sub-locks within a file and keeping track of them. By way of example, this singly-linked list may be represented in a computer by using a B-tree. The sub-locks may also be linked into an AVL tree structure for rapid access.

This Sub-Lock List is transformed as sub-locks are added to or removed from a file. A discussion the process of transforming this list will now be described with reference also to FIGS. 2a and 2b. Reference numerals 61, 66, 72, 78, 80, 83 and 90 all show the same Sub-Lock List which is being changed as sub-locks are added, deleted, split or merged. The list at 61 shows an empty Sub-Lock List which has a head pointer 62 which in this case is a null pointer because there are no sub-locks in the list. This list 61 corresponds to the situation in which no locks have been applied to the file 20, that is, before any lock requests. In other words, if the file 20 of FIG. 2a is completely unlocked then its associated Sub-Lock List would appear as shown in FIG. 3 at 61.

FIG. 3 will now be explained with reference to FIGS. 2a and 2b in which Lock Requests 1-6 are applied consecutively. These lock requests are illustrative of the type and sequence of requests that may occur within a resource. Initially, the file 20 of FIG. 2a has no locks upon it and its associated Sub-Lock List appears as shown in FIG. 3 at 61. Next, in FIG. 2a, a Lock Request 1 at 22 has placed a read lock upon the range 24 within the file 20. A sub-lock is then created to correspond to this range and this is shown as Sub-Lock 1 of FIG. 2a. Accordingly, in FIG. 3 this Sub-Lock 1 at 68 is shown added to the head of the Sub-Lock List 66. Also shown are some of the attributes 70 which correspond to this sub-lock. For brevity, only the Mode and the Reader Count of the sub-lock are shown. As shown in the List 66, Sub-Lock 1 is a read lock and the Reader Count is one, as indicated by "READ, 1".

Next, FIG. 2a shows at 26 that a Lock Request 2 has placed a read lock upon a range 28 of the file 20. Correspondingly, a new Sub-Lock 2 is created and added to the List 72 of FIG. 3. Shown in this list is the new Sub-Lock 2 at 74 and its associated attributes 76. The attributes 76 indicate that this is a read lock and that only one lock request has locked this range.

Note that the sub-locks are kept in consecutive order in the Sub-Lock List. In other words, the order in which sub-locks appear within a file is the order in which these sub-locks appear in the Sub-Lock List. Next, in FIG. 2a at 30, a new Lock Request 3 has also placed a read lock upon range 32, which is exactly the same range in the file as previously locked by Lock Request 1. Because these are both read locks, or shared locks, they may both co-exist in the same location. Accordingly, as Sub-Lock 1 already corresponds to this range in the file, it is not necessary to create a new sub-lock, it is only necessary to increment the Reader Count for Sub-Lock 1. Thus, as shown in FIG. 3 at 78 the new List still contains Sub-Locks 1 and 2 but the Reader Count of Sub-Lock 1 has been incremented to two. This Reader Count of two indicates that two users have requested a read lock for this same range, namely Lock Requests 1 and 3. Next, at 34 of FIG. 2a a Lock Request 4 has placed a write lock upon a range 36 of the file. Accordingly, a new Sub-Lock 3 is created. In FIG. 3 at 80, this new Sub-Lock 81 is added to the end of the Sub-Lock List, and its Mode is indicated as WRITE, as shown at 82.

Next, in FIG. 2a, a Lock Request 5 shown at 38 desires to place a read lock upon a range 40. This Lock Request 5 will succeed as it is not attempting to place a lock over a range of the file which had been previously write-locked. Because this range 40 includes Sub-Lock 1 and Sub-Lock 2, new sub-locks do not need to be created for these ranges, but the Reader Counts for these sub-locks will be incremented. However, for those ranges of the file indicated at 39, 42 and 41 which are currently unlocked, new sub-locks will need to be created to correspond to these ranges.

Accordingly, new Sub-Lock 4 is created to correspond to range 39, new Sub-Lock 5 is created to correspond to range 42 and new Sub-Lock 6 is created to correspond to range 41. The new Sub-Lock List for this file 20 is now shown in FIG. 3 at 83. This list 83 now contains those sub-locks for the file 20 listed in their consecutive order within the file. Shown first is Sub-Lock 4, 84 which has its attributes 85, namely "READ, 1". As Lock Request 5 is a read lock and the range of the file corresponding to Sub-Lock 4 has only this one read lock upon it, the Reader Count of Sub-Lock 4 is one. Next is Sub-Lock 1 and its Reader Count has been increased to three to indicate that three users have a read lock upon this region, namely Lock Requests 1, 3, 5. Next is newly created Sub-Lock 5 at 86 which also has a Reader Count of one. Sub-Lock 2 follows Sub-Lock 5, and Sub-Lock 6 follows Sub-Lock 2. Sub-Lock 2 has had its Reader Count increased to two to indicate that two read locks have been placed upon this range. Sub-Lock 6 at 88, likewise has a Reader Count of one because only Lock Request 5 has a read lock upon the range corresponding to Sub-Lock 6. Finally, in the List 83, Sub-Lock 3 corresponds to the write lock previously placed upon the last portion of the file 20.

Referring now to FIG. 2b, a procedure by which sub-locks are split will be illustrated. The corresponding change to the Sub-Lock List is shown at 90 in FIG. 3. In FIG. 2b a Lock Request 6 shown at 44 has placed a read lock on a range 45 of the file 20. Note that the beginning point of the range 45 falls within the original Sub-Lock I and the End Point for the range 45 falls within the range of the original Sub-Lock 2. These Sub-Locks 1 and 2 will be split into two sub-locks each because the number of read locks placed upon these ranges is different for certain portions of the range. Thus, the original Sub-Lock 1 has been split into two Sub-Locks 7 and 8 indicated at 46 and 48. Likewise, the original Sub-Lock 2 has been split into Sub-Locks 9 and 10 indicated at 50 and 52.

It is contemplated that two new sub-locks may be created to replace each of the original Sub-Locks 1 or 2, or it may possible to reuse one of the original sub-Locks and only create one new sub-lock. FIG. 3 at 90 shows a situation in which original Sub-Locks 1 and 2 have been replaced by new Sub-Locks 7 and 8, 9 and 10 respectively. New Sub-Lock 7 corresponds to that range of original Sub-Lock 1 which was not included in range 45. Accordingly, the Reader Count for Sub-Lock 7 is the same as that for the original Sub-Lock 1, namely three. But the newly created Sub-Lock 8 is within the range 45, thus its Reader Count has been increased to four. Sub-Lock 10 has a Reader Count of two which corresponds to the original Reader Count two of Sub-Lock 2. However, Sub-Lock 9 has its Reader Count increased by one because it is also the subject of a read lock by Lock Request 6. It is contemplated that as used herein, the term "create" may refer to either actually creating a new sub-Lock, or to reusing an existing sub-lock and incrementing its Reader Count to indicate that another lock request also has a lock upon the same region.

Figure 5:
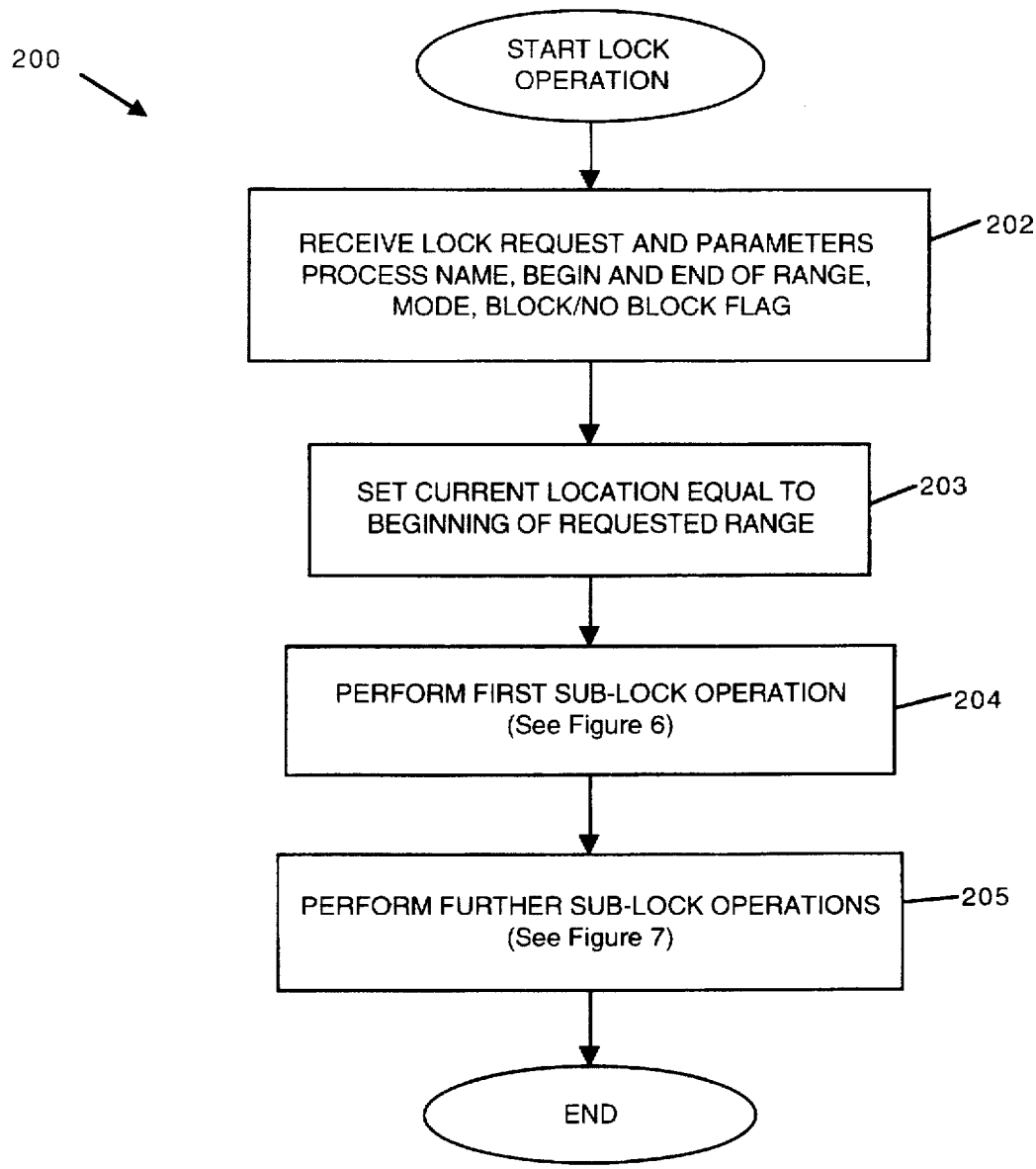
FIG. 5 is an overall flowchart for the lock operation according to one embodiment of the present invention.

FIG. 5 shows at 200 the overall procedure for the lock operation. In general, the lock operation is used when the system or a user requests that a particular range within a resource, such as a file, be either read locked or write locked. The lock operation will attempt to put a lock upon the range desired, and will either return "lock success" or "lock failure."

In step 202 the lock request is received by the lock operation. The four arguments passed into the lock operation are the name of the process requesting the lock, the range where the lock is desired, the Mode of lock desired, and a Block/No Block flag. The range for the requested lock is indicated by a variable begin, which marks the beginning of the requested range, and a variable end, which marks the end of the requested range. The Mode will either indicate that this is to be a read lock or a write lock.

The Block/No Block flag indicates whether synchronous or asynchronous locking is desired. If synchronous locking is desired the flag is set to Block. A Block flag indicates that the requesting process is able to wait for a range to become unlocked. A process may have to wait for a range to become unlocked if either a portion of that range is already write locked or if the user has a write lock request and portions of the range have already been locked. On the other hand, if the requesting process is unable to wait for the range or portion of the range to become unlocked, this indicates that asynchronous locking is desired and the flag will be set to No Block.

A pointer named Current Location is used as an index into the file to indicate the current location during a lock or unlock operation. The pointer Current Location may be incremented in terms of bytes, words, blocks or other units of a file. In step 203 the pointer Current Location is set equal to the beginning of the requested range as specified in the received arguments.

In step 204 the first sub-lock operation is performed. This operation may end with lock success, lock failure or control will continue on to step 205. Step 204 will be explained more fully below with reference to FIG. 6. In step 205 further sub-lock operations are performed. This step will either end in lock success or lock failure and will be explained more fully below with reference to FIG. 7.

Figure 6:
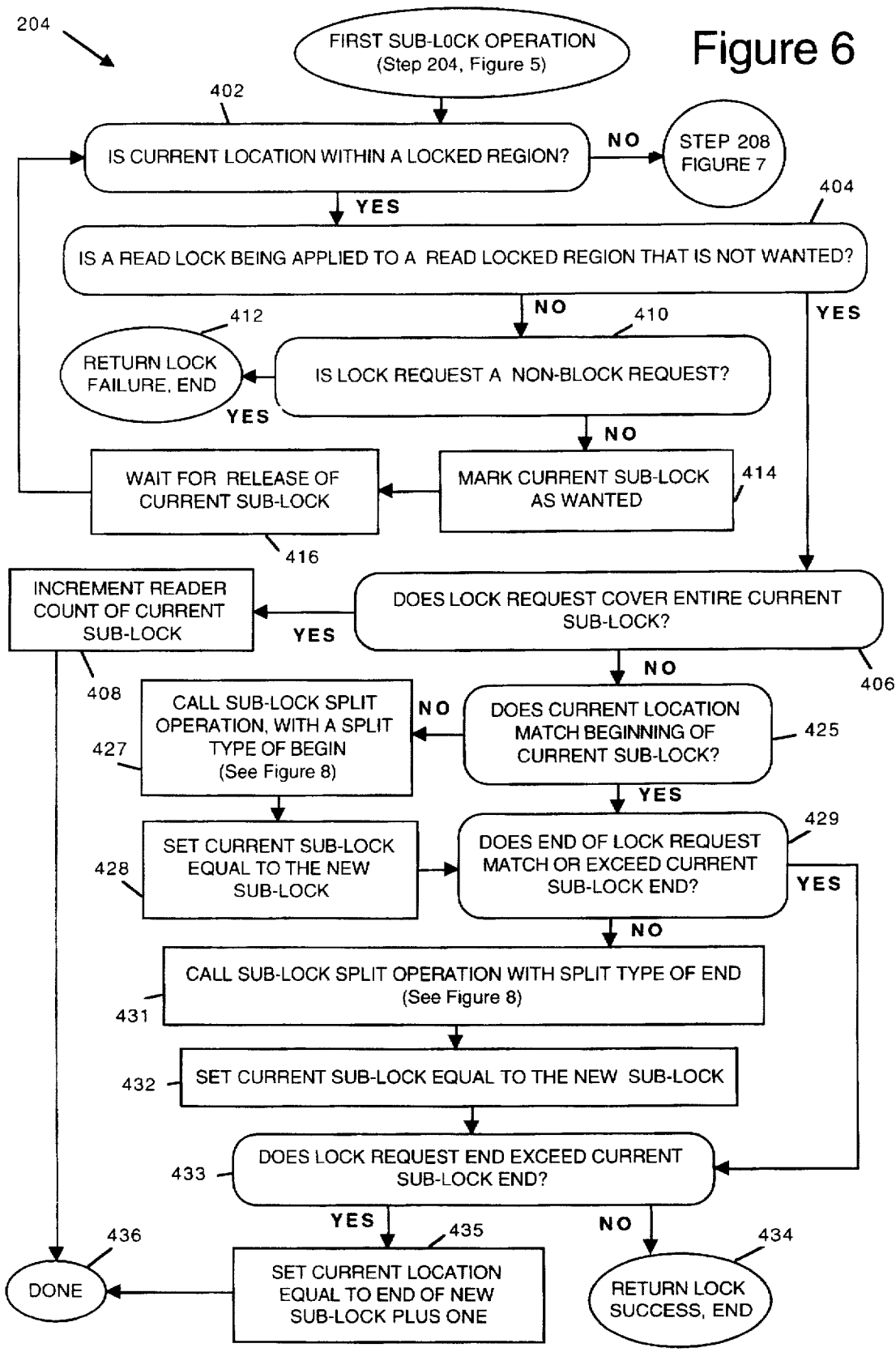
FIG. 6 is a flowchart for performing the first sub-lock operation in a lock operation.

FIG. 6 shows at 204 the first sub-lock operation, which is step 204 of FIG. 5. The first sub-lock operation processes a first sub-lock that may be within a locked region. If the range does not begin within a currently locked region then control would move to FIG. 7, Further Sub-Lock Operations. A split of type begin will only occur with the first sub-lock operation. Also, if a non-blocking request encounters a failure, there is no need to call the unlock operation because no regions have been locked. Although it is preferable to perform a first sub-lock operation and then further sub-lock operations, it is contemplated that these two procedures may combined into one.

Previously, the variable Current Location had been set to the beginning of the requested range. Step 402 tests whether Current Location is within a locked region. As the pointer Current Location is equal to the beginning of the requested range at this point, this test is checking whether the beginning of the range lies in a region of the file that is currently locked. If this region is currently unlocked, this means that a new sub-lock must be created for this region. In that case control moves from step 402 to step 208 of FIG. 7. From here on, a new sub-lock will be created and the remainder of the locking request will be processed as in FIG. 7. However, if the pointer Current Location is within a locked region, then control moves to step 404.

Step 404 tests whether a read lock is being applied to a read-locked region that is not marked as Wanted (if the Wanted Flag equals YES). Because the Current Location is within a locked region, the only circumstances under which the desired lock request can be immediately successful are if a read lock is being applied to a read-locked region that had not already been requested for a lock. If a write lock is being requested then the write lock request must wait until this region becomes unlocked. Also, if the region itself is write locked then any lock request must also wait. Additionally, if the region is marked as Wanted, then the current lock request may not immediately lock the region but must enter the Queue and wait for the locked region to become unlocked. If either of these situations are true, and the answer to step 404 is NO, then control moves to step 410 which will be described below.

However, if a read lock is being applied to a read-locked region that is not Wanted, (i.e. the answer to step 404 is YES), then this locked region may have another lock applied to it. Step 406 checks whether the lock request covers the entire current sub-lock. If so, then in step 408 the Reader Count of the current sub-lock is incremented to indicate that the current sub-lock also has a read lock applied to it by the current lock request. After step 408, because the lock request did cover the entire current sub-lock, and the Reader Count has been incremented, this first sub-lock operation is done at step 436 and control would return to step 205 of FIG. 5 for possible further sub-lock operations.

Referring now back to step 404 and the situation in which the result is NO, steps 410 and following will now be described. Step 410 tests whether the lock request has set the Block/No Block flag. If the lock request is a No Block request, this indicates that the lock request desires synchronous locking and that the lock request cannot wait for any locked regions within the lock request to be unlocked. In this situation, control would move to step 412, the operation ends and "lock failure" is returned. No regions need to be unlocked because as this is the first sub-lock operation, no regions have as yet been locked.

However, if in step 410 it is determined that the lock request has set the Block flag, this indicates that asynchronous locking is desired and that the lock request is able to wait for locked regions to be unlocked. Thus, if the answer to step 410 is NO then control moves to step 414. In step 414 the current sub-lock is marked as Wanted by setting the Wanted Flag in the current sub-lock equal to YES. Also, the current lock request goes to the end of the Queue in the current sub-lock. Next, in step 416 the current lock request enters a wait state in which it waits for the release of the current sub-lock. It should be appreciated that many different protocols can be used to determine which waiting lock request in the Queue will first be able to lock a recently unlocked region of the file. By way of example, it may be decided that all read lock requests should precede write lock requests, or vice-versa. Once the wait state is over, control moves to step 402 and the operation continues as described above.

Figure 2C:
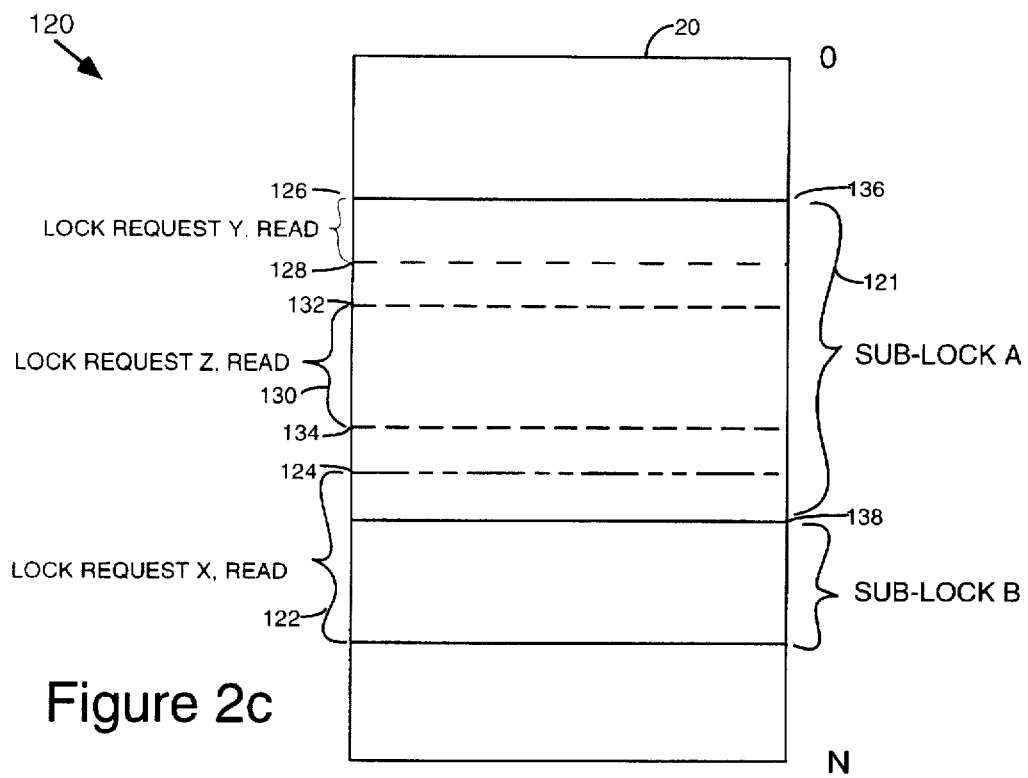
FIGS. 2c and 2d show examples of a resource undergoing sub-lock split operations and a resource in which sub-locks are being merged, respectively.

Returning now to step 406 when a NO results, if the lock request does not cover the entire current sub-lock then this current sub-lock must be split as explained below. The current sub-lock may have to be split into two or three new sub-locks. FIG. 2c at 120 shows a resource 20 with existing sub-locks and three possible ways in which a current sub-lock may be split. Note that only a lock request which is requesting a read lock can cause a split operation. If a write lock is being requested and there exists a sub-lock upon a desired region, the sub-lock would never be split because as an exclusive lock, the write request must wait until the region is unlocked. FIG. 2c shows a current Sub-Lock A 121 which may possibly be split in three different fashions by the Lock Requests X,Y,Z which are all requesting read locks. Request X 122 shows an example of a lock request with a beginning point 124 that starts within the current Sub-Lock A. Request Y 126 shows a lock request with an ending point 128 that ends within the current Sub-Lock A, and request Z 130 shows an example of a lock request that both begins 132 and ends 134 within the current Sub-Lock A. The procedure for performing these various splits will now be explained.

Step 425 checks whether the Current Location matches with the beginning of the current sub-lock. An answer of NO indicates that there is either a situation as demonstrated by request X or request Z in which the lock request begins at a region within Sub-Lock A. In this case, step 427 is executed and the sub-lock split operation is called and is passed the parameters Current Sub-Lock Current Location and a Split Type equivalent to begin. The sub-lock split operation will be explained in more detail below with reference to FIG. 8. In step 428 the variable Current Sub-Lock is updated to indicate the new sub-lock which has just been created by the sub-lock split operation. Next, step 429 is performed as explained below.

However, if the answer to the test in step 425 is YES, this indicates that the lock request begins at the beginning of the current sub-lock and ends within the current sub-lock. Thus, a situation as illustrated in FIG. 2c by process Y exists. Step 429 checks whether the end of the lock request matches or exceeds the end of the current sub-lock. If the end of the lock request matches or exceeds the end of the sub-lock this indicates that the current lock request does not end within the current sub-lock and this sub-lock need not be split, and control moves to step 433. However, if the end of the lock request does end within the current sub-lock then after step 429 control moves to step 431 and another split must be performed. In step 431 the sub-lock split operation is performed and will split the current sub-lock at a location indicated by the end of the lock request. The parameters passed to the sub-lock split operation will be the Current Sub-Lock, the end of the lock request and a Split Type of end. Step 431 corresponds to a situation as shown in FIG. 2c where either process Y or process Z has an end point within Sub-Lock A.

For example, if the answer to step 425 is YES and the answer to step 429 is NO, then step 431 corresponds to the situation as shown by process Y in which the lock request does not begin within the current Sub-Lock A but only ends within the current Sub-Lock A. However, if the answer to step 425 is no and the answer to step 429 is no, then step 431 corresponds to a situation in which process Z is requesting a lock that not only begins within Sub-Lock A but also ends within Sub-Lock A. In this situation Sub-Lock A will be split into three sub-locks. The first sub-lock would begin at the beginning of Sub-Lock A and end at the beginning of the process Z request. The second sub-lock would begin at the beginning of the process Z request and end at the end of the process Z request. And finally, the third new sub-lock created would begin at the end of the process Z request and end at the end of Sub-Lock A.

Next, in step 432 the variable Current Sub-Lock must be updated to the new sub-lock which has been created by the split operation of step 431. Step 433 tests whether the end of the lock request exceeds the end of the current sub-lock. If not, this indicates that the lock request has been fully processed and all regions desired to be locked have been locked. Thus, in step 434 the lock operation ends and "lock success" is returned. However, if the end of the lock request does exceed the current sub-lock, this indicates that the lock request has not finished and in step 435 the pointer Current Location will be updated to point to the end of the last sub-lock created plus one in order to indicate that Current Location now points to the next region to be processed. After step 435 the first sub-lock operation is done and control then moves to step 205 of FIG. 5.

Figure 7:
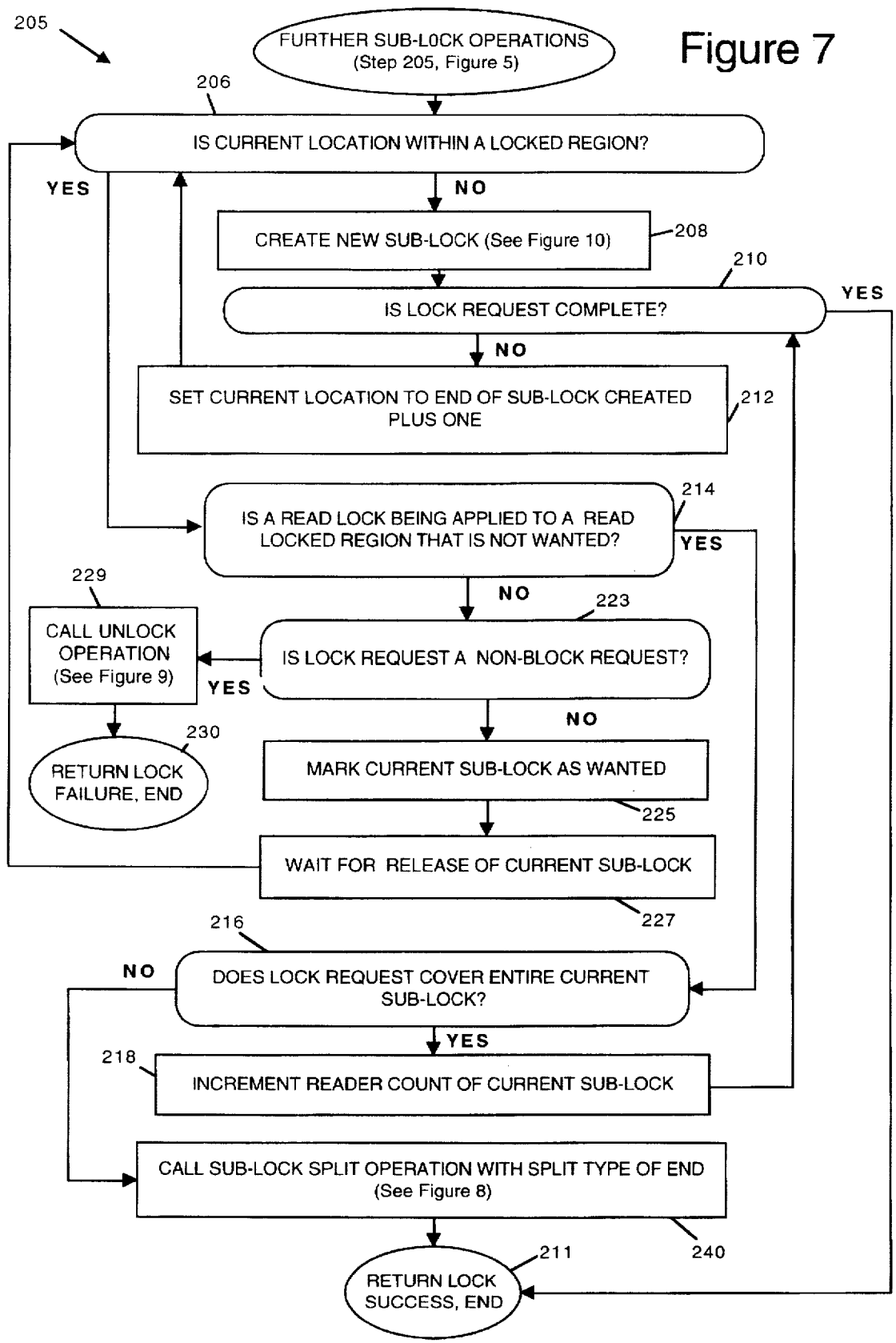
FIG. 7 is a flowchart for performing further sub-lock operations in a lock operation.

FIG. 7 shows the perform further sub-lock operation step 205 from FIG. 5. These operations are performed once the first sub-lock operation has been performed. Step 206 checks whether the pointer Current Location points to a currently locked region. If not, then this region of the file is currently not locked and a new sub-lock must be created. In step 208 a new sub-lock is created and added into the Sub-Lock List at the appropriate location. This newly created sub-lock will lock a region up to the end of the lock request or up to the next locked region. Step 208 will be explained more fully below with reference to FIG. 10.

Once a new sub-lock has been created in step 208, the following steps are performed. Step 210 tests whether the lock request is complete. The lock request will be complete if the desired region has been locked up to the end of the lock request. In this situation the lock operation ends in step 211 and "lock success" is returned. However, if the lock request is not complete, then in step 212 the pointer Current Location is set equal to the end of the newly created sub-lock plus one. Thus, the pointer Current Location will indicate the next region within the file that is desired to be locked by the lock request. After step 212 control moves to step 206 in which it will be determined if the Current Location is within a locked region, if a new sub-lock needs to be created, etc.

Returning now to step 206 when a YES results, if Current Location is within a locked region then it must be determined whether the requested lock is a read lock or a write lock and whether the region itself has been read locked or write locked. Step 214 tests whether a read lock is being applied to a read-locked region that is not marked as Wanted (if the Wanted Flag equals YES). Because the Current Location is within a locked region, the only circumstances under which the desired lock request can be immediately successful are if a read lock is being applied to a read-locked region that had not already been requested for a lock. If a write lock is being requested then the write lock request must wait until this region becomes unlocked. Also, if the region itself is write locked then any lock request must also wait or fail (if asynchronous). Additionally, if the region is marked as Wanted then the current lock request may not immediately lock the region but must enter the Queue and wait for the lock region to become unlocked. If either of these situations are true, and the answer to step 214 is NO then control moves to step 223.

However, if a read lock is being applied to a read-locked region that is not Wanted, (i.e. the answer to step 214 is YES), then this locked region may have another lock applied to it. Step 216 checks whether the lock request covers the entire current sub-lock. If so, then in step 218 the Reader Count of the current sub-lock is incremented to indicate that the current sub-lock also has a read lock applied to it by the current lock request. After step 218, because the lock request did cover the entire current sub-lock, control moves to step 210 in which it will be determined if the lock request is complete or if further regions or sub-locks need to be locked by the lock request. After step 210, control continues as described above.

However, if in step 216 the lock request does not cover the entire sub-lock, then the current sub-lock must be split. In this case, control would move from step 216 to step 240. This is a situation as illustrated in FIG. 2c with reference to process Y. In this example, the current sub-lock is Sub-Lock A, and the process Y is requesting a read lock on a portion of the current Sub-Lock A which does not cover the entire Sub-Lock A but ends at an intermediate point within Sub-Lock A. In step 240 the sub-lock split operation is performed by passing the parameters Current Sub-Lock, the End Point of the lock request and a Split Type of end. Again with reference to FIG. 2c, this sub-lock split operation will split the current sub-lock as illustrated into two new sub-locks. The first sub-lock will begin at the beginning point of Sub-Lock A and end at the End Point of the lock request of process Y, and the second new sub-lock will begin at the End Point of the lock request of process Y and end at the End Point of Sub-Lock A. Because the end point of the lock request has been reached, next in step 211 the lock operation ends and "lock success" is returned.

Referring now back to step 214 and the situation in which the result is NO, steps 223 and following will now be described. Step 223 tests whether the lock request has set the Block/No Block flag. If the lock request is a No Block request, this indicates that the lock request desires synchronous locking and that the lock request cannot wait for any locked regions within the lock request to be unlocked. In this situation, control would move to step 229. Step 229 calls the unlock operation for a range that begins at the beginning of the current lock request up to the Current Location. Because the current lock request cannot wait for locked regions to be unlocked, any regions that had previously been locked up to the Current Location must be unlocked before the lock request can terminate. The unlock operation will be described in more detail below with reference to FIG. 9. Next in step 230 the lock operation ends and "lock failure" is returned.

However, if in step 223 it is determined that the lock request has set the Block flag, this indicates that asynchronous locking is desired and that the lock request is able to wait for locked regions to be unlocked. Thus, if the answer to step 223 is no then control moves to step 225. In step 225 the current sub-lock is marked as Wanted by setting the Wanted Flag in the current sub-lock equal to YES. Also, the current lock request goes to the end of the Queue in the current sub-lock. Next, in step 227 the current lock request enters a wait state in which it waits for the release of the current sub-lock. It should be appreciated that many different protocols can be used to determine which waiting lock request in the Queue will first be able to lock a recently unlocked region of the file.

Once the current lock request is reactivated (by any of various known mechanisms) to apply a lock to the current sub-lock then control returns to step 206. At this point, it is not possible for this lock request to immediately lock the desired region because the state of sub-locks within the file may have changed while the lock request was in its wait state. For this reason, the lock request must again return to step 206 in order to determine whether the desired region is currently locked, what type of lock is upon it, whether a read lock or a write lock is desired, etc.

Figure 8:
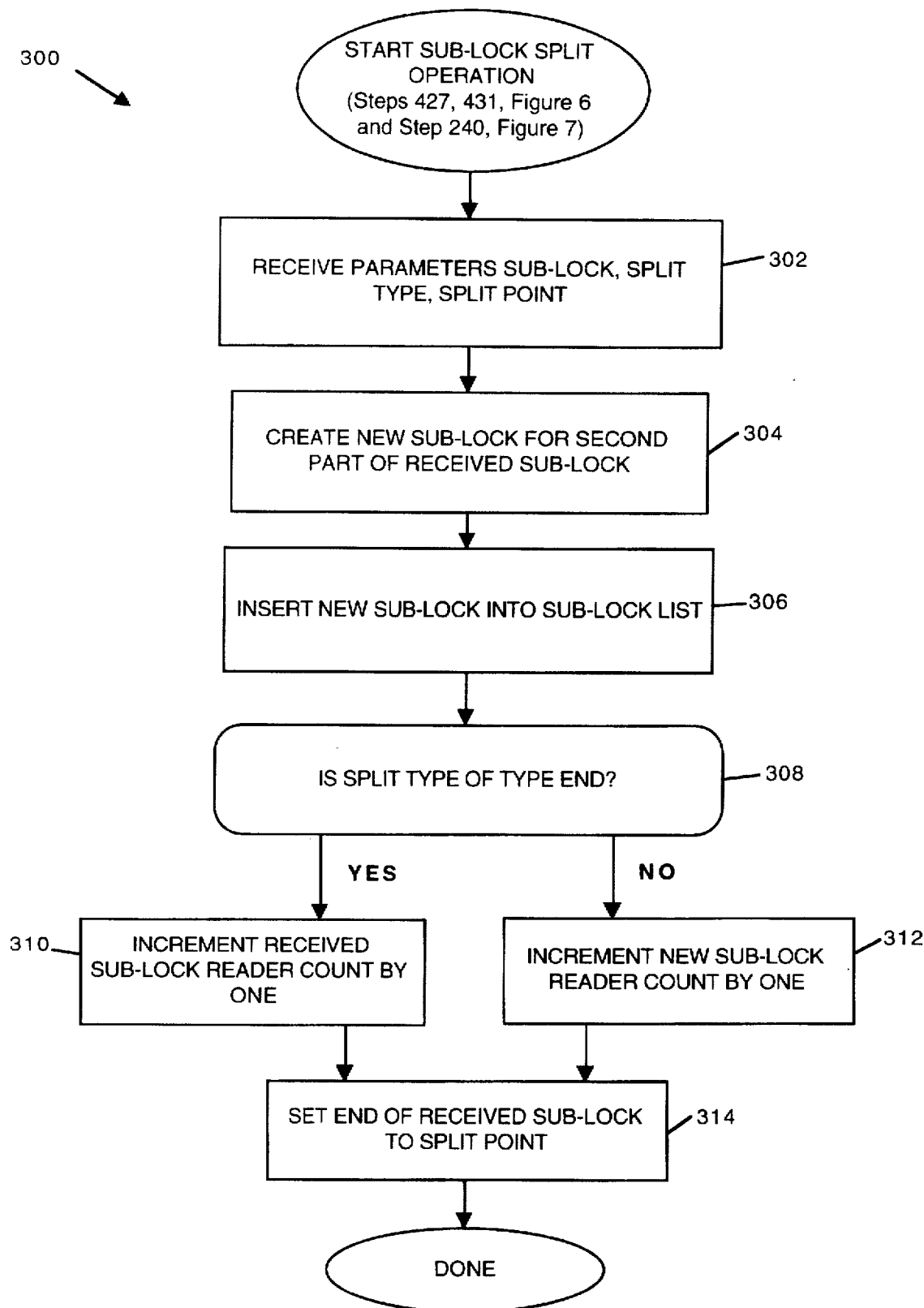
FIG. 8 is a flowchart for performing a sub-lock split operation.

FIG. 8 shows at 300 the sub-lock split operation which is used by steps 427 and 431 of FIG. 6, and step 240 of FIG. 7. The sub-lock split operation is used to split the current sub-lock when the range of the lock request either begins within the current sub-lock or ends within the current sub-lock. In either case, the current sub-lock will be split into two consecutive regions. The current sub-lock will be retained and will correspond to the first region and a new sub-lock will be created that corresponds to the second half of the current sub-lock which has just been split.

Two types of sub-lock split operations are possible. In one case the lock request ends within the current sub-lock and in the second case the lock request begins within the current sub-lock. If the lock request both begins and ends within a sub-lock then each type of sub-lock split operation is performed once. In step 302 the sub-lock split operation receives three parameters from the calling step. Received are the sub-lock to be split, a Split Point and a Split Type. The Split Point is that point within the current sub-lock at which the lock request either begins or ends. The Split Type will either be begin or end which signifies that the lock request either begins or ends within the current sub-lock.

In step 304 a new sub-lock is created for the second part of the current sub-lock. This new sub-lock may be created as described in FIG. 10, except that during this split operation no attempts will be made to try and merge sub-locks. This new sub-lock will be initialized with the following attributes. The Mode will be set to READ, the Wanted Flag will be set to NO, the Begin Point will be the Split Point, the End Point will be the end point of the received sub-lock and the Reader Count will be the same Reader Count as the received sub-lock. In step 306 the newly created sub-lock is inserted into the Sub-Lock List. Because the newly created sub-lock is the second part of the received sub-lock that has been split, this new sub-lock will be inserted into the Sub-Lock List immediately after the received sub-lock. It should be appreciated that this convention may be reversed. For example, the newly created sub-lock may be the first part of the received sub-lock and the received sub-lock would then correspond to the second part of the received sub-lock which is split.

Step 308 tests whether the Split Type is of type begin or of type end. If it is a type end, this indicates that the lock request ends within the received sub-lock, which means that the received sub-lock Reader Count must be incremented by one as shown in step 310. However, if the Split Type is of type begin, this indicates that the lock request begins within the received sub-lock and the newly created sub-lock must have its Reader Count incremented by one, as in step 312. In this situation the Reader Count of the new sub-lock must be incremented by one because the lock request covers the region including the new sub-lock but does not cover the region corresponding to the received sub-lock. In step 314 the End Point of the received sub-lock is set equal to the Split Point. This step effectively splits the received sub-lock into two portions because the end of the received sub-lock has been reset to the Split Point which is a location within the received sub-lock. After step 314 the sub-lock split operation is done, and control returns to the step from which this operation was called.

Figure 9:
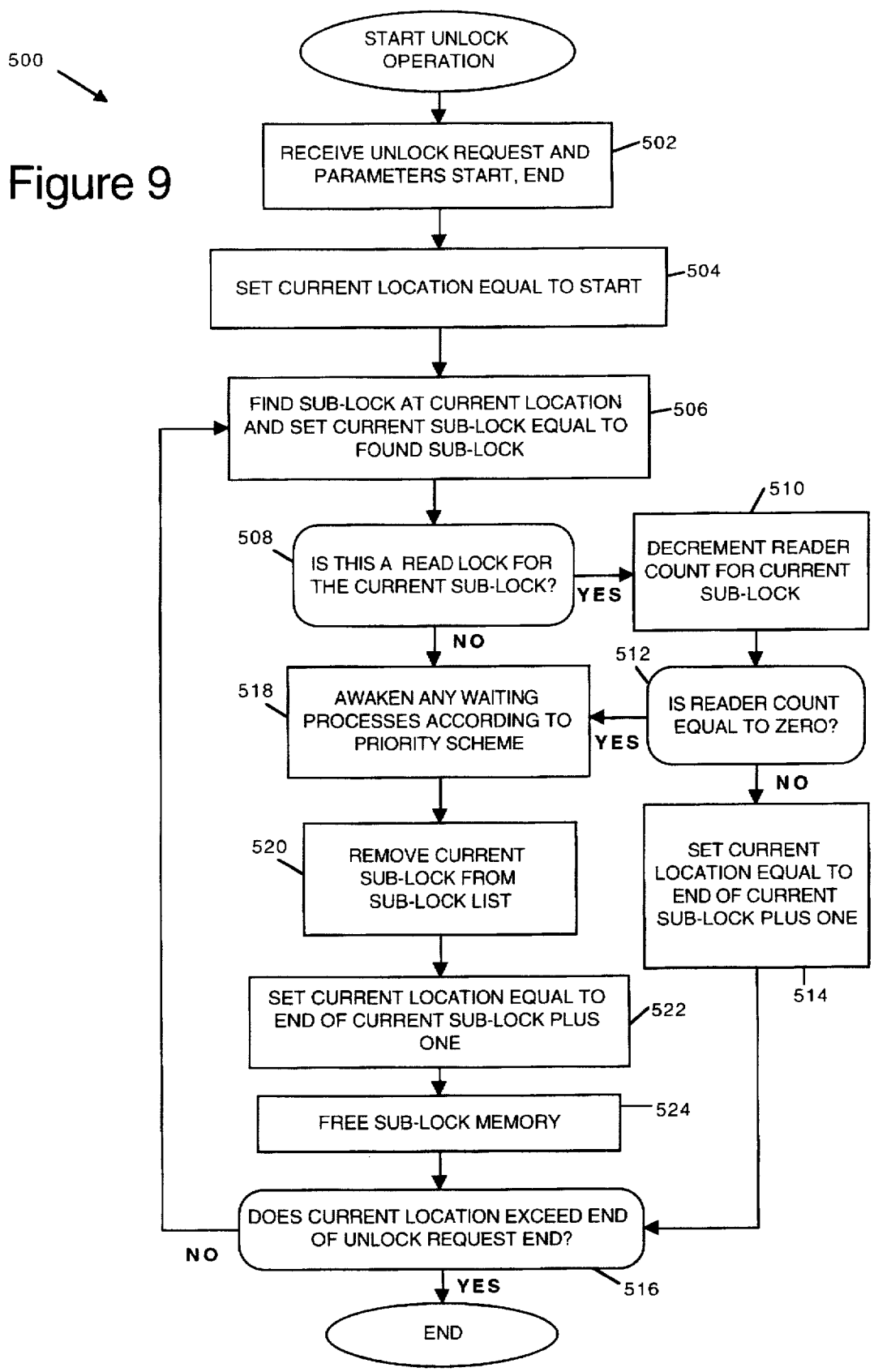
FIG. 9 is a flowchart for performing an unlock operation.

FIG. 9 at 500 shows a flowchart representing the unlock operation. The unlock operation is used to unlock or "free" regions of a resource that had previously been the subject of a lock by a process. However, one process unlocking a region may not imply that the region is completely unlocked as the region may be the subject of locks by other processes. The unlock operation may be called directly by the operating system of the computer, a process or program running on the computer, or by the user. Alternatively, the unlock operation may be called as a subset within the lock operation. For example, the lock operation at step 229 of FIG. 7 calls this unlock operation.

At step 502 the unlock request is received and two parameters are passed in to the unlock operation. The parameters Start and End correspond respectively to the starting point and ending point of a region that has previously been locked and is now desired to be unlocked. In step 504 the pointer Current Location is set equal to Start. Step 506 finds the sub-lock at the Current Location and the variable Current Sub-Lock is set equal to this sub-lock which has been found. Because this region had previously been locked, it is a certainty that there will be a sub-lock at this location. The sub-lock at this location may be determined by various techniques known in the art. By way of example, it may be found by searching through the Sub-Lock List and determining for which sub-lock the Current Location is located within its Begin and End Points.

Step 508 determines if the current sub-lock is a read lock. If the current sub-lock is not a read lock, the current sub-lock may be a write lock in which case once this lock is removed, this region will be completely unlocked and available to any waiting request. In this case, control moves to step 518. In step 518 any lock request or waiting processes which are waiting in the Queue for that current sub-lock are awakened according to an appropriate priority scheme and these requests are then able to lock this region which has just been unlocked. In step 520 the current sub-lock is removed from the Sub-Lock List because this region is no longer locked. In step 522 the pointer Current Location is set equal to the end of the current sub-lock plus one. This step increments the pointer to point at the region immediately after the current sub-lock. In step 524 memory associated with this current sub-lock is freed.

After step 524 step 516 tests whether the Current Location exceeds the end of the unlock request. This can be determined by comparing the pointer Current Location to the parameter end which has been passed into the unlock operation. If the Current Location does exceed the end of the unlock request then this means that the unlock operation has ended and control would then return to the process which requested the unlock operation. Or if step 229 of FIG. 7 requested the unlock operation, this step would then be done. However, if the Current Location does not exceed the end of the unlock request, this means that more sub-locks need to be unlocked and control returns to step 506 to loop at least one more time through this operation.

Returning now to step 508 described above, if there is a read lock on the current sub-lock, this means that at least one process has placed a read lock upon this current sub-lock and control moves to step 510. In step 510 the Reader Count for the current sub-lock is decremented by one to indicate that the process requesting an unlock operation no longer desires a read lock on this current sub-lock. In step 512 if the Reader Count equals zero this means that the region is completely unlocked and control moves to step 518 to perform the steps as described above. However, if the Reader Count is not equal to zero, this means that at least one other process still has a read lock upon this region and control moves to step 514. In step 514 the pointer Current Location is set equal to the end of the current sub-lock plus one. After step 514 control moves to step 516 and the sub-lock operation will either end or return to step 506 as described above.

Figure 10:
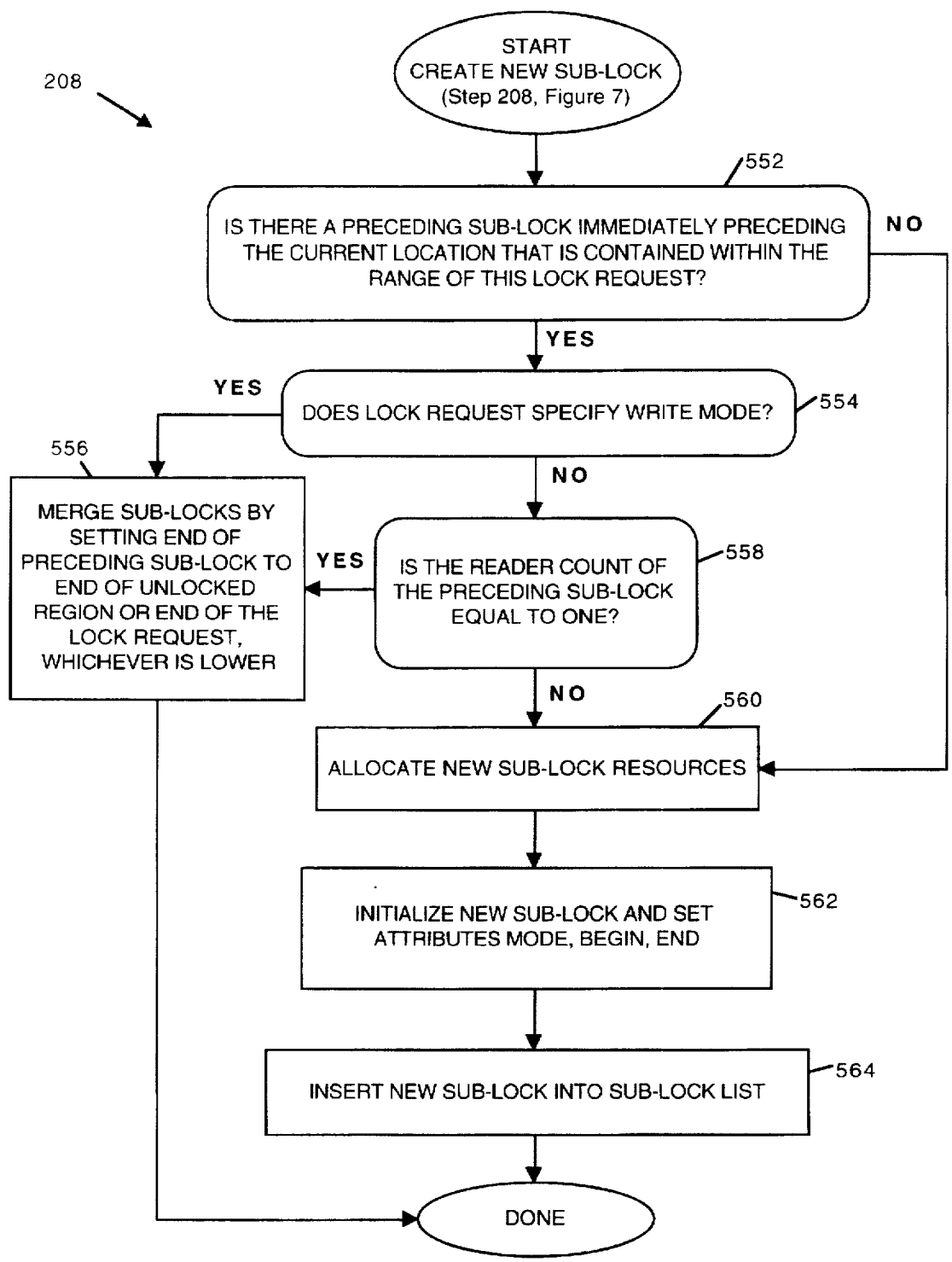
FIG. 10 is a flowchart for creating a new sub-lock.

FIG. 10 at 208 shows a procedure for creating a new sub-lock. This procedure will create a new sub-lock in a previously unlocked region. This procedure is used by step 208 of FIG. 7. This procedure accomplishes its goal by either actually creating a new sub-lock, or by joining two sub-locks within a single lock request. That is, instead of creating a new sub-lock at the Current Location if the current request had previously locked the region immediately preceding the Current Location then the region after the Current Location which is unlocked would be merged with the immediately preceding sub-lock. This concept of merging will be explained first and then FIG. 10 will be explained in detail.

Figure 2D:
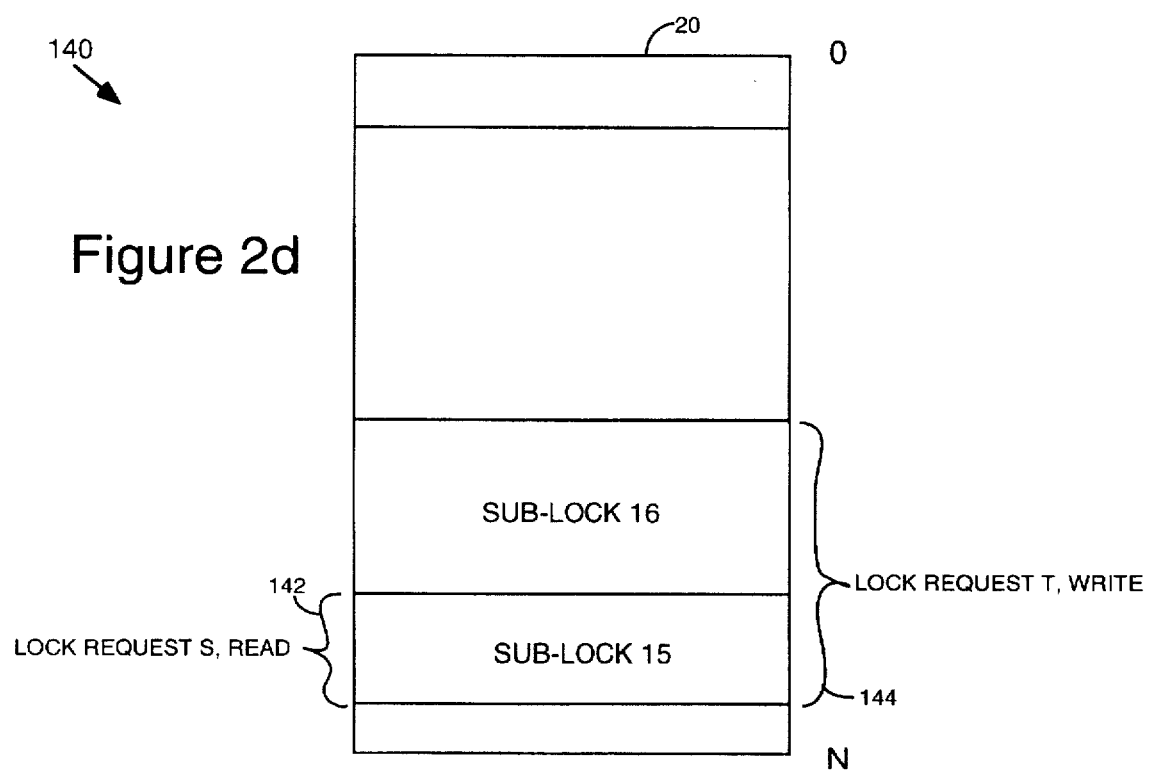

Merging may be better explained by reference to FIG. 2d. At one point in time, a process S has a read lock on the region indicated by Sub-Lock 15. Later in time, when a process T desires to perform a write lock upon the region shown, process T may be able to perform a write lock upon the region indicated by Sub-Lock 16, but will not be able to complete its write lock operation because the region indicated by Sub-Lock 15 has been read locked by process S. In this case, process T may wait. However, once process S has finished with its region, it may release its read lock upon the region indicated by Sub-Lock 15. Once this region has been unlocked, it would then be available for locking by process T. When process T is able to finish its write lock operation by putting a write lock on the region indicated by Sub-Lock 15, it would not be necessary for a new sub-lock to be created at this region. Rather, this region may simply be merged into the region indicated by Sub-Lock 16 and a new sub-lock would not need to be created. This situation occurs when a recently unlocked region is desired to be locked by a lock request that has also locked an immediately preceding region.

Returning now to FIG. 10, step 552 tests whether there is a preceding sub-lock immediately preceding the Current Location that is also contained within the range of this lock request. If such a preceding sub-lock does not exist, this means that a new sub-lock must be created and control moves to step 560. However, if there is such a preceding sub-lock then control moves to step 554. Step 554 tests whether the current lock request specifies write mode or read mode. If write mode is specified this means that the preceding sub-lock is being exclusively used or has been exclusively locked by the current lock request and the two regions may be immediately merged and control moves to step 556. However, if the current lock request is for a read lock, this may imply that the immediately preceding sub-lock may have other read locks upon it. In that case, the two regions may not be immediately merged because this would destroy the read locks of the other processes. In this situation, control moves to step 558.

Step 558 tests whether the Reader Count of the preceding sub-lock is equal to one. If the Reader Count is equal to one, this means that no other process has a read lock upon this region and control moves to step 556 in order to merge the two regions. However, if the Reader Count is not equal to one, this means that other processes have read locks upon this region and a new sub-lock must be created; thus, control moves to step 560. In step 556 these two regions are effectively merged together by setting the End Point of the preceding sub-lock to the end of the unlocked region or the end of the lock request, whichever is lower. After step 556 this create new sub-lock procedure is done.

Returning now to step 560 referred to above, if the two regions may not be merged, then a new sub-lock for this previously unlocked region must be created. In step 560 new resources are allocated for this new sub-lock. Resources may include memory and a queue for this new sub-lock. Step 562 initializes the attributes for this new sub-lock. The Mode for this new sub-lock is set equal to the Mode of the current lock request. The Begin Point is set equal to the Current Location pointer, and the End Point is set equal to the minimum of the end of the lock request or the end of the unlocked region. The Wanted Flag is set equal to "no", the Reader Count is set equal to one and the Queue is initialized to the null list. In step 564 this new sub-lock is inserted into the Sub-Lock List. As this new sub-lock corresponds to the region immediately after the preceding sub-lock, the new sub-lock will be inserted into the Sub-Lock List immediately after the preceding sub-lock. After step 564 this procedure is done.

Analogous to the concept of splitting a sub-lock is the concept of merging sub-locks back together that had been previously been split. This concept can best be explained by reference to FIG. 2c. In this example, assume that an initial lock request has obtained a read lock over the region indicated by Sub-Lock A. At some later time, if another process Z requires a read lock completely within the region indicated by Sub-Lock A, this lock request will be granted, but it means that Sub-Lock A must be split into three smaller sub-locks. The region indicated by Sub-Lock A would then be split into a first sub-lock which begins at the beginning of Sub-Lock A and ends at the beginning of the lock requested by process Z. The second new sub-lock would correspond exactly to the region requested by process Z, and the third new sub-lock would begin at the end of the region requested by process Z and would end at the end of Sub-Lock A.

Sub-lock merging may then be used when process Z releases its read lock upon this middle region. Once this region has been released by process Z, note that the initial lock request still maintains a complete read lock over the region indicated by Sub-Lock A, yet this region has been split into three different sub-locks. In this situation, these three sub-locks which are contiguous and which all are read-locked by the initial lock request may be merged back into one sub-lock corresponding to the region indicated by Sub-Lock A. This procedure is implemented when a sub-lock is unlocked, and checks immediately before and immediately after this recently unlocked sub-lock in order to determine whether a single lock request has a read lock upon all three of these regions.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

In addition, the present invention further relates to computer readable media which include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

Figure 1:
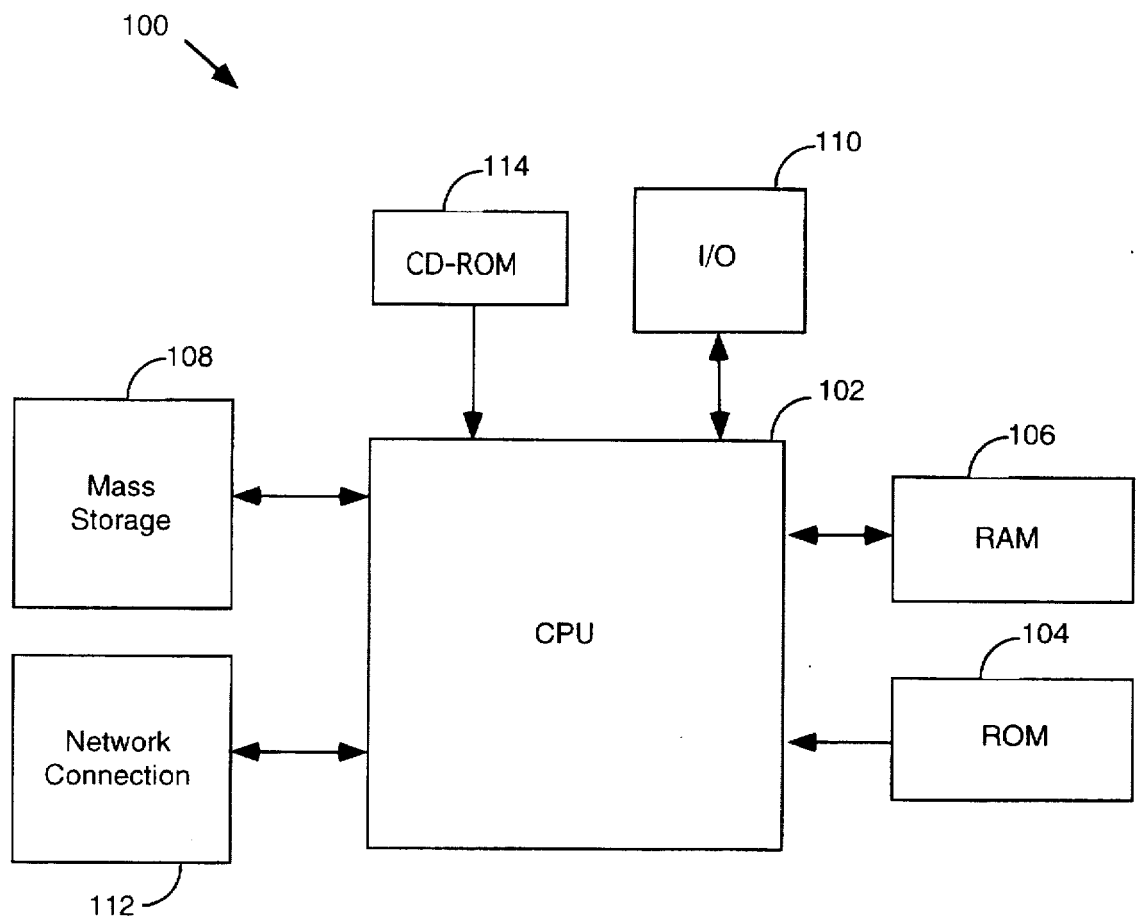
FIG. 1 shows a typical computer-based system in accordance with the present invention.

FIG. 1 at 100 shows a typical computer-based system in accordance with the present invention. Shown is a central processing unit 102 (CPU) which is coupled to memory devices including read only memory 104 (ROM) and random access memory 106 (RAM). As is well known in the art, ROM 104 acts to transfer data and instructions unidirectionally to the CPU and RAM 106 is used typically to transfer data and instructions in a bi-directional manner. A mass memory device 108 is also coupled bi-directionally to CPU 102 and provides additional data storage capacity. The mass memory device 108 may be used to store programs, data and the like and may take the form of a magnetic or paper tape reader or some other well-known device. It will be appreciated that the information retained within the mass memory device 108, may, in appropriate cases, be incorporated in standard fashion as part of RAM 106 as virtual memory. A specific mass storage device such as a CD-ROM 114 may also pass data uni-directionally to the CPU.

CPU 102 is also coupled to one or more input/output devices 110 which include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally can be coupled to a computer or telecommunications network using a network connection as shown generally at 112. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in some detail for purposes of clarity of understanding, it will be apparent that certain changes and modifications may be practiced within the scope of the appended claims. For instance, the flexible range locking technique described may be practiced upon any resource within a computer system, such as a file, disk, tape, unit of memory, etc. It is also contemplated that the technique would be able to lock portions of a resource located remotely, by using network communications, for example. In addition, the sub-locks created may be represented by any suitable data structure within a computer. Therefore, the described embodiments should be taken as illustrative and not restrictive, and the invention should not be limited to the details given herein but should be defined by the following claims and their full scope of equivalents.

I claim:

1. A sub-lock structure embodied in a computer-readable medium for use in managing a plurality of locks placed upon a resource of a computer system, the computer system being arranged to allow a plurality of locks to be simultaneously placed upon the resource such that the resource may have both locked and unlocked portions of different sizes, a lock being placed upon a requested range of the resource by a process of the computer system, the sub-lock structure including a plurality of sub-locks, each sub-lock corresponding to a unique region within the resource, each sub-lock comprising:

begin and end points indicative of the unique region within the resource to which the sub-lock corresponds and being embodied in said computer-readable medium;

a mode identifier indicative of the type of the lock placed upon the unique region;

a reader count attribute indicative of the number of locks placed upon the unique region of the resource; and a link attribute indicating the next consecutive sub-lock in the sub-lock structure, the link attribute arranged to allow the sub-lock structure to be traversed from one sub-lock to another.

2. A sub-lock structure as recited in claim 1 wherein each sub-lock further comprises:

a queue structure for storing an indication of those processes waiting to place a lock upon the unique region to which the sub-lock corresponds; and a wanted flag indicative of at least one process waiting in the queue structure.

3. A computer apparatus for use in managing a plurality of locks placed upon a resource of the computer apparatus, the computer apparatus being arranged to allow a plurality of locks to be simultaneously placed upon the resource such that the resource may have both locked and unlocked portions of different sizes, a lock being placed upon a requested range of the resource by a process of the computer apparatus, the computer apparatus comprising:

a central processing unit;

random access memory in communication with the central processing unit;

a mass storage device in communication with the central processing unit;

a sub-lock structure including a plurality of sub-locks, each sub-lock corresponding to a unique region within the resource, each sub-lock including begin and end points indicative of the unique region within the resource to which the sub-lock corresponds, a mode identifier indicative of the type of the lock placed upon the unique region, a reader count attribute indicative of the number of locks placed upon the unique region of the resource, and a link attribute indicating the next consecutive sub-lock in the sub-lock structure, the link attribute arranged to allow the sub-lock structure to be traversed from one sub-lock to another.

4. A computer-implemented method of unlocking a requested range within a resource of a computer system, the computer system being arranged to allow a plurality of locks to be simultaneously placed upon the resource, a sub-lock table structure being provided to identify all of the currently effective locks placed upon the resource through the use of sub-locks, each sub-lock within the sub-lock table structure having associated begin and end points corresponding to a unique range within the resource such that the unique ranges defined by the sub-locks in the sub-lock table structure do not overlap, the method comprising the steps of:

receiving a requested range within the resource to be unlocked, the requested range including an unlock range start point and an unlock range end point;

identifying a first sub-lock corresponding to a first portion of the requested range, the first sub-lock having a begin point and an end point, one of the unlock range start point and the unlock range end point being located within the begin point and the end point inclusive;

unlocking the first portion of the requested range corresponding to the first sub-lock;

identifying a second sub-lock corresponding to a second portion of the requested range, the second portion being contiguous with the first portion and having a different size; and unlocking the second portion of the requested range corresponding to the second sub-lock; and determining whether the first sub-lock is a shared lock or an exclusive lock, wherein when it is determined that the first sub-lock is a shared lock, the unlocking step is performed by decrementing a reader counter associated with the first sub-lock.

5. A method as recited in claim 4 wherein when it is determined that the first sub-lock is an exclusive lock, the unlocking step is performed by removing the first sub-lock from the sub-lock table structure and the method further comprises the step of alerting any waiting processes to the availability of the first portion of the requested range.

6. A computer-implemented method of placing a lock upon a requested range within a resource of a computer system, the computer system being arranged to allow a plurality of locks to be simultaneously placed upon the resource through the use of sub-locks, each sub-lock having a sub-lock type, the resource arranged to have both locked and unlocked portions, the method comprising the steps of:

requesting that a lock be placed upon a requested range within a resource, the lock request including a requested lock type and the requested range including a lock range start point and a lock range end point; and determining whether an existing sub-lock in the sub-lock structure corresponds to a portion of the requested range, wherein when it is determined that the existing sub-lock in the sub-lock structure corresponds to a portion of the requested range the method further comprises the steps of, determining whether the lock request is a shared lock request or an exclusive lock request, determining whether the existing sub-lock is a shared sub-lock or an exclusive sub-lock, wherein when it is determined that the lock request is a shared lock request and the existing sub-lock is a shared sub-lock the method further comprises the step of indicating that the portion of the requested range corresponding to the existing sub-lock is now also shared by the lock request by incrementing a reader count attribute associated with the existing sub-lock.

7. A method as recited in claim 6 wherein when it is determined that at least one of the lock request and the existing sub-lock is exclusive, the method further comprises the step of:

checking whether a block flag is set, wherein when it is determined that a block flag is set, the lock request is placed in a wait state until the existing sub-lock is removed from the portion of the requested range to which it corresponds and indicating that the portion of the requested range corresponding to the existing sub-lock is wanted by the lock request, and wherein when it is determined that a block flag is not set, the lock request fails.

8. A method as recited in claim 7 wherein when it is determined that the block flag is not set, the method further comprises the step of performing an unlock operation to release any locks placed upon the resource by the lock request including the sub-step of decrementing a second reader count attribute associated with a lock placed upon the resource.

9. A computer program product comprising a computer-usable medium having computer-readable code embodied thereon for placing a lock upon a requested range within a resource of a computer system, the computer system being arranged to allow a plurality of locks to be simultaneously placed upon the resource such that the resource may have both locked and unlocked portions, the computer program product comprising the following computer-readable program code for effecting actions in the computer:

program code for requesting that a lock be placed upon a requested range within a resource, the requested range including a lock range start point and a lock range end point;

program code for creating a first sub-lock which corresponds to a first continuous portion of the requested range within the resource, the first sub-lock having a first sub-lock begin point and a first sub-lock end point, the first sub-lock begin point corresponding to the lock range start point;

program code for creating a second sub-lock which corresponds to a second distinct continuous portion of the requested range within the resource that is contiguous with but does not overlap with that first portion of the requested range corresponding to the first sub-lock, the first and second sub-locks having ranges having different sizes;

program code for storing an indication of the sub-locks created in a sub-lock structure, the sub-lock structure including any number of sub-locks, the sub-locks within the sub-lock structure representing all of the locks placed upon the resource, each sub-lock within the sub-lock structure having a begin point and an end point corresponding to a unique range within the resource such that the unique ranges defined by the sub-locks in the sub-lock structure do not overlap, and wherein each sub-lock of the sub-lock structure further includes a read counter, and the program code for creating additional sub-locks includes program code for incrementing the read counter of a previously existing sub-lock to indicate that the range of the resource corresponding to the previously existing sub-lock is also shared by the lock request.

10. A computer program product as recited in claim 9 further comprising program code for creating additional sub-locks, each additional sub-lock corresponding to a distinct portion of the requested range within the resource that is contiguous with the immediately preceding sub-lock, but does not overlap any of the previous sub-locks.

11. A computer program product as recited in claim 9 wherein each sub-lock of the sub-lock structure further includes a mode indicator indicative of the type of the sub-lock and the lock request includes a request indicator indicative of the type of the lock request, the computer program product further including the following computer-readable program code:

program code for determining whether an existing sub-lock corresponding to an existing range that is located at least partially within the requested range is of type exclusive;

program code for determining whether the lock request is of type exclusive, wherein when it is determined that one of the existing sub-lock and the lock request is of type exclusive, the computer program product further includes program code for unlocking those portions of the requested range that had previously been locked by the lock request.

12. A computer-implemented method of transmitting the computer-readable program code as recited in claim 9 over a computer network, the method comprising the steps of:

storing the program code onto a computer-usable medium;

receiving a request for the transmission of the program code;

marshalling the program code into a format suitable for transmission over the computer network; and transmitting the program code over the computer network to a remote location.

13. A computer-implemented method of placing a lock upon a requested range within a resource of a computer system, the computer system being arranged to allow a plurality of locks to be simultaneously placed upon the resource such that the resource may have both locked and unlocked portions, the method comprising the steps of:

requesting that a lock be placed upon a requested range within a resource, the requested range including a lock range start point and a lock range end point;

creating a first sub-lock which corresponds to a first continuous portion of the requested range within the resource, the first sub-lock having a first sub-lock begin point and a first sub-lock end point, the first sub-lock begin point corresponding to the lock range start point and the first sub-lock end point corresponding to an arbitrary point within the requested range;

creating a second sub-lock which corresponds to a second distinct continuous portion of the requested range within the resource that is contiguous with but does not overlap with that first portion of the requested range corresponding to the first sub-lock; and storing an indication of the sub-locks created in a sub-lock structure, the sub-lock structure including any number of sub-locks, the sub-locks within the sub-lock structure representing all of the locks placed upon the resource, each sub-lock within the sub-lock structure having a begin point and an end point corresponding to a unique range within the resource such that the unique ranges defined by the sub-locks in the sub-lock structure do not overlap, and each sub-lock of the sub-lock structure further including a read counter, and wherein said step of creating a second sub-lock is performed by incrementing the read counter of a previously existing sub-lock to indicate that the range of the resource corresponding to the previously existing sub-lock is also shared by the lock request.

14. A method as recited in claim 13 further comprising the step of creating additional sub-locks, each additional sub-lock corresponding to a distinct portion of the requested range within the resource that is contiguous with an immediately preceding sub-lock, but does not overlap any of the additional sub-locks.

15. A method as recited in claim 13 wherein the sub-lock structure is arranged such that the sub-locks within the sub-lock structure can be accessed in a sequential order corresponding to the sequential order of the unique ranges within the resource to which each sub-lock corresponds.

16. A method as recited in claim 13 wherein each sub-lock of the sub-lock structure further includes a mode indicator indicative of the type of the sub-lock and the lock request includes a request indicator indicative of the type of the lock request, the method further comprising the steps of:

determining whether an existing sub-lock corresponding to an existing range that is located at least partially within the requested range is of type exclusive;

determining whether the lock request is of type exclusive, wherein when it is determined that one of the existing sub-lock and the lock request is of type exclusive, the method further includes the sub-step of unlocking those portions of the requested range that had previously been locked by the lock request by at least decrementing the read counter associated with said portions of the requested range that had previously been locked.

17. A computer-implemented method of placing a lock upon a requested range within a resource of a computer system, the computer system being arranged to allow a plurality of locks to be simultaneously placed upon the resource, the method comprising the steps of:

providing a sub-lock table structure arranged to identify all of the currently effective locks placed upon the resource through the use of sub-locks, each sub-lock within the sub-lock table structure having associated begin and end points corresponding to a unique range within the resource such that the unique ranges defined by the sub-locks in the sub-lock table structure do not overlap, and wherein each sub-lock within the sub-lock table structure has an associated counter that identifies the number of currently effective locks that lock the range associated with the sub-lock;

requesting that a new lock be placed upon a requested range within a resource, the requested range including a new lock range start point and a new lock range end point;

identifying a first sub-lock range which corresponds to a first continuous portion of the requested range within the resource, the first sub-lock range having a first sub-lock begin point and a first sub-lock end point, the first sub-lock begin point corresponding to the new lock range start point;

determining whether any previously stored sub-lock in the sub-lock table structure has a corresponding boundary point located at an intermediate position within the requested range, wherein when it is determined that no previously stored sub-lock in the sub-lock table structure has a corresponding boundary point located at an intermediate position within the requested range, the first sub-lock end point is set to the new lock range end point and wherein when it is determined that a previously stored sub-lock in the sub-lock table structure does have a corresponding boundary point located at an intermediate position within the requested range, the first sub-lock end point is set to a first encountered boundary point within the requested range that corresponds to either a begin point or an end point of a previously stored sub-lock; and storing an indication of the first sub-lock range in the sub-lock table structure, and wherein when the first sub-lock range overlaps a range associated with a previous stored sub-lock, the first sub-lock range indication storing step involves setting the counter associated with the first sub-lock range to a value that indicates the invocation of one more lock than the previously stored sub-lock.

18. A method as recited in claim 17 further comprising the step of determining whether the new lock range start point is located at an intermediate position within the range of a previously stored sub-lock, wherein when it is determined that the new lock range start point is located at an intermediate position in an intersected previously stored sub-lock, the method further comprises the steps of:

setting the end point of the intersected previously stored sub-lock to the new lock range start point;

creating a new entry in the sub-lock table corresponding to the first sub-lock, whereby the counter associated with the new entry in the sub-lock table is set to a value that indicates the invocation of one more lock than the counter associated with the intersected previously stored sub-lock.

19. A computer-implemented method as recited in claim 17 wherein when it is determined that a previously stored sub-lock in the sub-lock table structure does have a corresponding boundary point located at an intermediate position within the requested range, and the intermediately positioned boundary point is a sub-lock start point, the method further comprises the step of setting the first sub-lock end point to a position mediately before the previously stored sub-lock start point and incrementing the counter associated with said first sub-lock range.

20. A computer implemented method as recited in claim 17 further comprising the step of determining whether the requested range is entirely within a range associated with any previously stored sub-lock, wherein when it is determined that the requested range is entirely within a range associated with an overlapped previously stored sub-lock, the method further comprises the steps of:

splitting the overlapped previously stored sub-lock into three new sub-locks; and setting the counter associated with one of said three new sub-locks that corresponds to said requested range to a value indicating the number of locks upon said requested range.

21. A computer-implemented method of placing a lock upon an arbitrary requested range within a resource of a computer system, the computer system being arranged to allow a plurality of locks to be simultaneously placed upon the resource, the method comprising the steps of:

requesting that a lock be placed upon the requested range within the resource, the requested range representing an arbitrary portion of the resource that is less than the entire resource and including a lock range start point and a lock range end point;

creating a first sub-lock which corresponds to a first continuous portion of the requested range within the resource, the first sub-lock having attributes including a first sub-lock begin point and a first sub-lock end point, wherein both the first sub-lock begin point and the first sub-lock end point are within the requested range, and wherein said first sub-lock further includes a counter indicative of the number of locks placed upon said first continuous portion of the requested range within the resource; and storing an indication of the first sub-lock in a sub-lock structure, the sub-lock structure including any number of sub-locks, the sub-locks within the sub-lock structure representing all of the locks placed upon the resource, each sub-lock within the sub-lock structure having a begin point and an end point corresponding to a unique range within the resource such that the unique ranges defined by the sub-locks in the sub-lock structure do not overlap, and each sub-lock within the sub-lock structure further including a counter indicative of number of locks placed upon said unique range represented by said each sub-lock.

22. A method as recited in claim 21 wherein the lock request includes a lock request mode indicator indicative of a type of lock that is desired and each sub-lock created by the lock request has a corresponding sub-lock mode identifier.

23. A method as recited in claim 21 further comprising the step of determining whether any sub-locks previously identified in the sub-lock structure correspond to a portion of the requested range, wherein when it is determined that no sub-locks previously identified in the sub-lock structure correspond to a portion of the requested range the method further comprises the steps of:

assigning the first sub-lock begin point to the lock range start point and assigning the first sub-lock end point to the lock range end point; and setting the counter associated with said first sub-lock to a value of one.

24. A method as recited in claim 21 further comprising the step of:

determining whether a single one of the lock range start point and the lock range end point is located within the range of a second sub-lock that has been previously stored in the sub-lock structure, the second sub-lock having a second sub-lock begin point and a second sub-lock end point; and wherein when it is determined that a single one of the lock range start point and the lock range end point is located between the begin point and the end point of the second sub-lock in the sub-lock structure, the method further comprises the steps of:

creating a third sub-lock, splitting the second sub-lock into two portions such that a first portion corresponds to a new range of the second sub-lock and a second portion corresponds to the range of the third sub-lock, incrementing the counter associated with one of said second sub-lock and said third sub-lock, and storing the third sub-lock in the sub-lock structure.

25. A method as recited in claim 21 further comprising the step of:

determining whether both of the lock range start point and the lock range end point are located within the range of a second sub-lock that has been previously stored in the sub-lock structure, the second sub-lock having a second sub-lock begin point and a second sub-lock end point; and wherein when it is determined that both of the lock range start point and the lock range end point are located between the begin point and the end point of the second sub-lock in the sub-lock structure, the method further comprises the steps of:

creating a third sub-lock, splitting the second sub-lock into three portions such that a first portion corresponds to a new range of the second sub-lock, a second portion corresponds to the range of the first sub-lock and a third portion corresponds to the range of the third sub-lock, incrementing the counter associated with said first sub-lock to one more than the counter value for the counter of the original second sub-lock, and storing the third sub-lock in the sub-lock structure.

* * * * *